US012696345B2

(12) United States Patent
Elshafie et al.

(10) Patent No.: US 12,696,345 B2
(45) Date of Patent: Jul. 28, 2026

(54) REFERENCE SIGNAL AND CHANNEL STATE INFORMATION PROCESSING OUTSIDE A DISCONTINUOUS RECEPTION ACTIVE TIME

(71) Applicant: QUALCOMM Incorporated, San Diego, CA (US)

(72) Inventors: Ahmed Elshafie, San Diego, CA (US); Diana Maamari, San Diego, CA (US); Huilin Xu, Temecula, CA (US)

(73) Assignee: QUALCOMM Incorproated, San Diego, CA (US)

( * ) Notice: Subject to any disclaimer, the term of this patent is extended or adjusted under 35 U.S.C. 154(b) by 761 days.

(21) Appl. No.: 18/069,013

(22) Filed: Dec. 20, 2022

(65) Prior Publication Data

US 2024/0206006 A1     Jun. 20, 2024

(51) Int. Cl.
*H04W 76/28* (2018.01)
*H04L 5/00* (2006.01)

(52) U.S. Cl.
CPC ........... *H04W 76/28* (2018.02); *H04L 5/0048* (2013.01)

(58) Field of Classification Search
CPC ... H04W 76/28; H04W 8/24; H04W 52/0216; H04W 52/0229; H04L 5/0048; Y02D 30/70
See application file for complete search history.

(56) References Cited

U.S. PATENT DOCUMENTS

| 2021/0028844 A1 | 1/2021 | Song et al. |
| 2021/0153054 A1 | 5/2021 | Damnjanovic et al. |
| 2022/0070781 A1 | 3/2022 | Karakkad Kesavan Namboodiri et al. |

(Continued)

FOREIGN PATENT DOCUMENTS

| CN | 115804159 A | * | 3/2023 | ............ H04W 64/00 |
| WO | 2022195778 A1 | | 9/2022 | |

OTHER PUBLICATIONS

3GPP TS 38.214: "3rd Generation Partnership Project, Technical Specification Group Radio Access Network, NR, Physical layer procedures for data (Release 16)", 3GPP TS 38.214 V16.11.0 (Sep. 2022), pp. 1-175.

(Continued)

*Primary Examiner* — Ayanah S George
(74) *Attorney, Agent, or Firm* — Shumaker & Sieffert, P.A.

(57) ABSTRACT

A first network entity for wireless communication may be configured to operate according to a connected DRX mode based on a wakeup signal (WUS), wherein the connected DRX mode includes a DRX active time and a DRX inactive time. The first network entity may send, to a second network entity, capability information of the first network entity to process, during the DRX inactive time, reference signal information, wherein the reference signal information includes one or more of: a reference signal or a reference signal report. The first network entity may receive, from the second network entity, a configuration based on the capa- (Continued)

■ Configuration 210
■ Reference Signal Information 220
■ Capability Information 225
■ Reference Signal 230 bility information, wherein the configuration specifies how the first network entity is to process the reference signal information during the DRX inactive time, and may process the reference signal information during the DRX inactive time in accordance with the configuration.

38 Claims, 16 Drawing Sheets

(56) References Cited

U.S. PATENT DOCUMENTS

| | | | |
|---|---|---|---|
| 2023/0199659 A1* | 6/2023 | Zhou | H04L 5/0078 |
| | | | 370/318 |
| 2024/0057031 A1* | 2/2024 | Okamura | H04W 4/02 |

OTHER PUBLICATIONS

Huawei, et al., "Discussion on Inactive State Positioning and On-Demand PRS", 3GPP Draft, 3GPP TSG RAN WG1 Meeting #106bis-e, R1-2109744, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 2, 2021, 8 Pages, XP052058673, Sections 2 and 3.

International Search Report and Written Opinion—PCT/US2023/081866—ISA/EPO—Jun. 14, 2024.

Partial International Search Report—PCT/US2023/081866—ISA/EPO—Apr. 16, 2024.

* cited by examiner

Configuration 210

Reference Signal Information 220

Capability Information 225

Reference Signal 230

UE power consumption model for FR1

| Power State | Characteristics | Relative Power |
|---|---|---|
| Deep Sleep | Time interval for the sleep should be larger than the total transition time entering and leaving this state. Accurate timing may not be maintained. | 1 (Optional: 0.5) |
| Light Sleep | Time interval for the sleep should be larger than the total transition time entering and leaving this state. | 20 |
| Micro Sleep | Immediate transition is assumed for power saving study purpose from or to a non-sleep state. | 45 |
| PDCCH-only | No PDSCH and same-slot scheduling; this includes time for PDCCH decoding and any micro-sleep within the slot | 100 |
| SSB or CSI-RS proc. | SSB can be used for fine time-frequency sync. and RSRP measurement of the serving/camping cell. TRS is the considered CSI-RS for sync. FFS the power scaling for processing other configurations for CSI-RS | 100 |
| PDCCH + PDSCH | PDCCH + PDSCH. ACK/NACK in long PUCCH is modeled by UL power state | 300 |
| UL | Long PUCCH or PUSCH | 250 (0 dBm) 700 (23 dBm) |

Low power sleep states

FIG. 5

UE power consumption model for FR2

| Power State | Characteristics | Relative Power | |
|---|---|---|---|
| | | FR1 | FR2 |
| PDCCH-only | No PDSCH and same-slot scheduling; this includes time for PDCCH decoding and any micro-sleep within the slot | 100 | 175 |
| SSB or CSI-RS proc. | SSB can be used for fine time-frequency sync. and RSRP measurement of the serving/camping cell. TRS is the considered CSI-RS for sync. FFS the power scaling for processing other configurations for CSI-RS | 100 | 175 |
| PDCCH + PDSCH | PDCCH + PDSCH. ACK/NACK in long PUCCH is modeled by UL power state | 300 | 350 |
| UL | Long PUCCH or PUSCH | 250 (0 dBm) 700 (23 dBm) | 350 (FFS Tx power level) |

UE power consumption during the state transition

| Sleep Type | Additional transition energy: (Relative power x ms) | Total transition time |
|---|---|---|
| Deep sleep | 450 | 20 ms |
| Light sleep | 100 | 6 ms |
| Micro sleep | 0 | 0 ms* |
| * | Immediate transition is assumed for power saving study purpose from or to a non-sleep state | |

FIG. 7

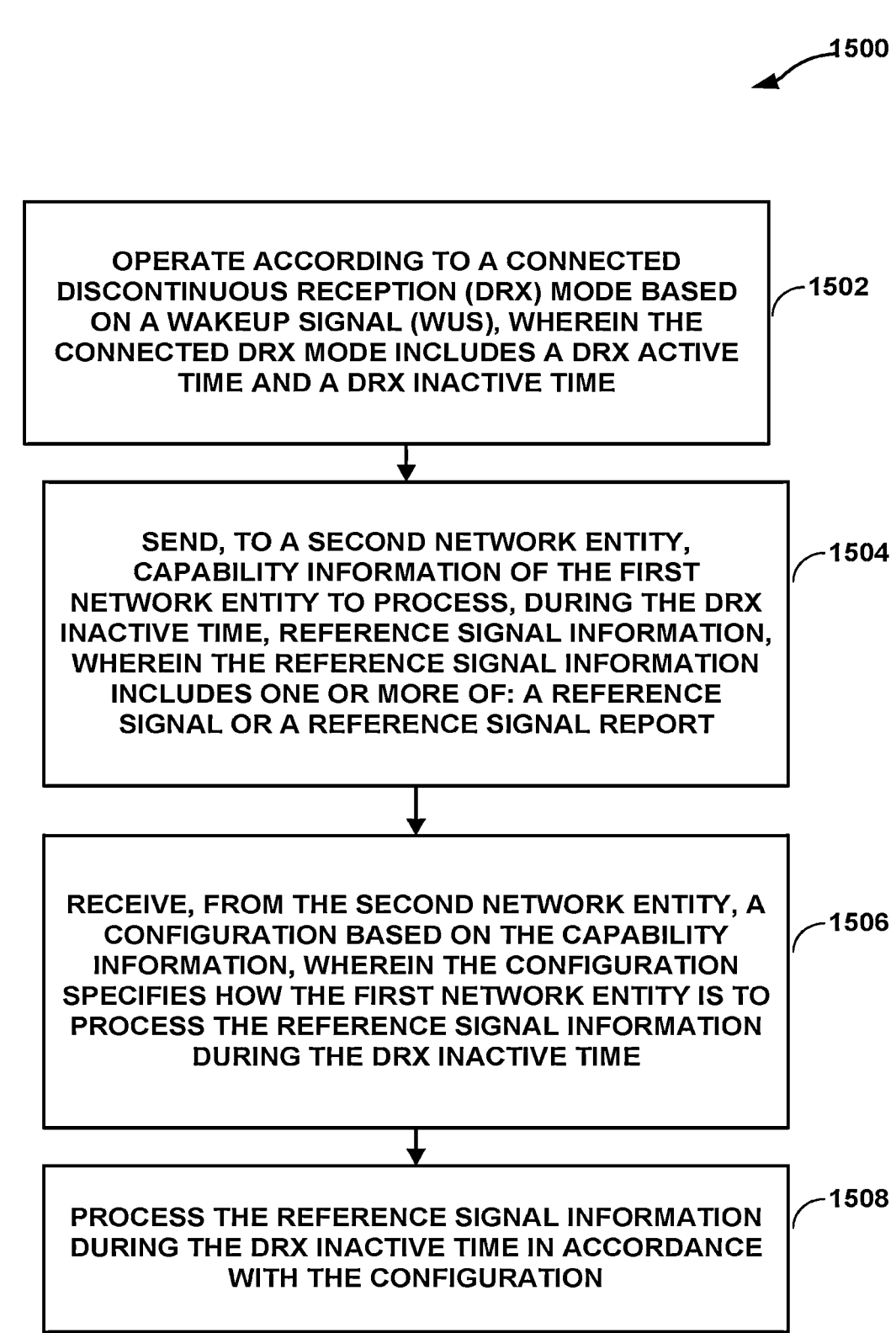

1500

OPERATE ACCORDING TO A CONNECTED DISCONTINUOUS RECEPTION (DRX) MODE BASED ON A WAKEUP SIGNAL (WUS), WHEREIN THE CONNECTED DRX MODE INCLUDES A DRX ACTIVE TIME AND A DRX INACTIVE TIME

1502

SEND, TO A SECOND NETWORK ENTITY, CAPABILITY INFORMATION OF THE FIRST NETWORK ENTITY TO PROCESS, DURING THE DRX INACTIVE TIME, REFERENCE SIGNAL INFORMATION, WHEREIN THE REFERENCE SIGNAL INFORMATION INCLUDES ONE OR MORE OF: A REFERENCE SIGNAL OR A REFERENCE SIGNAL REPORT

1504

RECEIVE, FROM THE SECOND NETWORK ENTITY, A CONFIGURATION BASED ON THE CAPABILITY INFORMATION, WHEREIN THE CONFIGURATION SPECIFIES HOW THE FIRST NETWORK ENTITY IS TO PROCESS THE REFERENCE SIGNAL INFORMATION DURING THE DRX INACTIVE TIME

1506

PROCESS THE REFERENCE SIGNAL INFORMATION DURING THE DRX INACTIVE TIME IN ACCORDANCE WITH THE CONFIGURATION

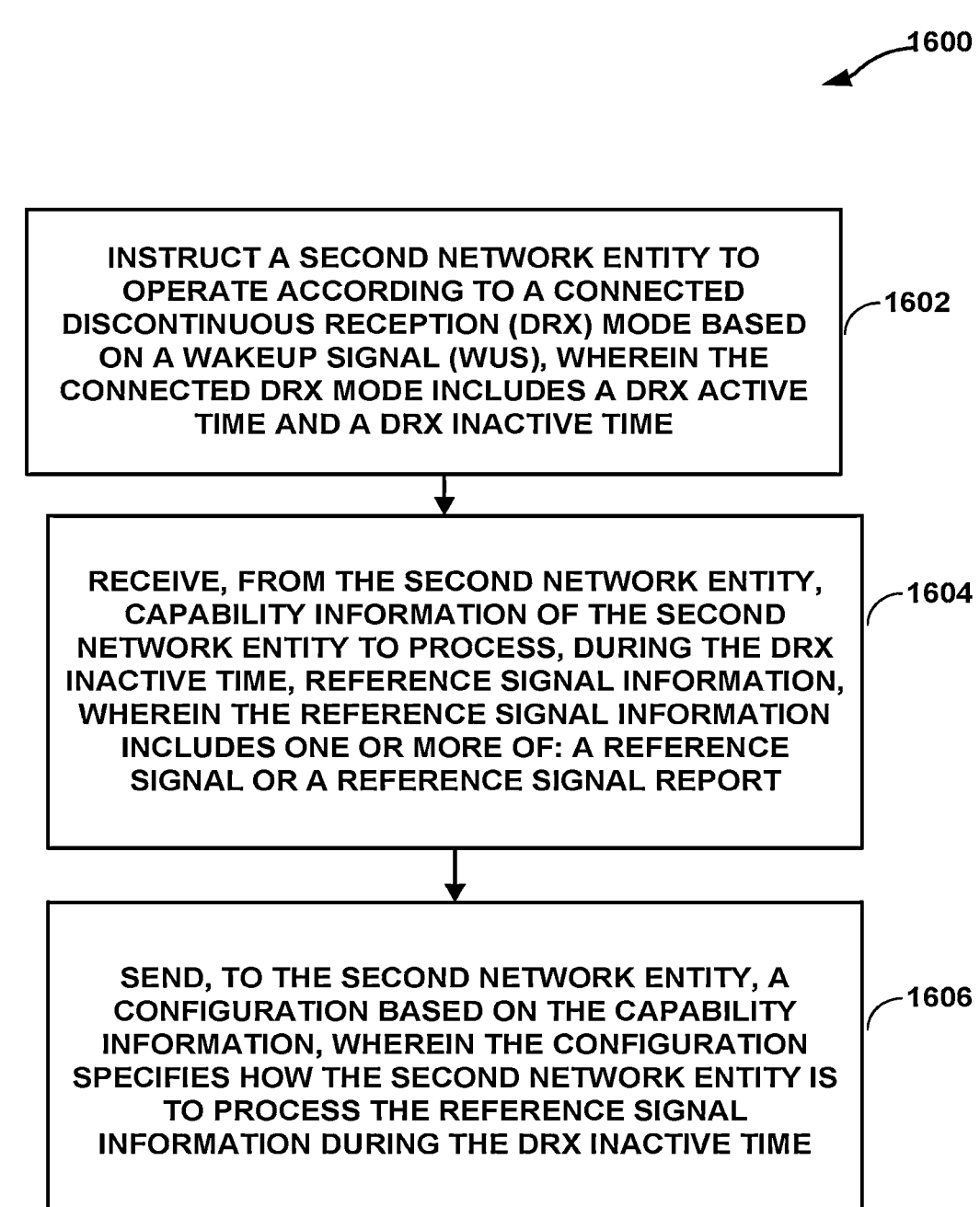

1600

INSTRUCT A SECOND NETWORK ENTITY TO OPERATE ACCORDING TO A CONNECTED DISCONTINUOUS RECEPTION (DRX) MODE BASED ON A WAKEUP SIGNAL (WUS), WHEREIN THE CONNECTED DRX MODE INCLUDES A DRX ACTIVE TIME AND A DRX INACTIVE TIME ⌐1602

RECEIVE, FROM THE SECOND NETWORK ENTITY, CAPABILITY INFORMATION OF THE SECOND NETWORK ENTITY TO PROCESS, DURING THE DRX INACTIVE TIME, REFERENCE SIGNAL INFORMATION, WHEREIN THE REFERENCE SIGNAL INFORMATION INCLUDES ONE OR MORE OF: A REFERENCE SIGNAL OR A REFERENCE SIGNAL REPORT ⌐1604

SEND, TO THE SECOND NETWORK ENTITY, A CONFIGURATION BASED ON THE CAPABILITY INFORMATION, WHEREIN THE CONFIGURATION SPECIFIES HOW THE SECOND NETWORK ENTITY IS TO PROCESS THE REFERENCE SIGNAL INFORMATION DURING THE DRX INACTIVE TIME ⌐1606

FIG. 16

REFERENCE SIGNAL AND CHANNEL STATE INFORMATION PROCESSING OUTSIDE A DISCONTINUOUS RECEPTION ACTIVE TIME

TECHNICAL FIELD

This disclosure relates generally to wireless communication systems, and more particularly, to techniques for reference signal transmission, reception, measurement, and reporting.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some wireless communications systems, such as 4G and 5G systems, may support channel state information (CSI) operations and may also support discontinuous reception (DRX) operations.

As the demand for mobile broadband access continues to increase, research and development continue to advance wireless communication technologies not only to meet the growing demand for mobile broadband access, but to advance and enhance the user experience with mobile communications.

SUMMARY

The following presents a summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later. While some examples may be discussed as including certain aspects or features, all discussed examples may include any of the discussed features. Unless expressly described, no one aspect or feature is essential to achieve technical effects or solutions discussed herein.

Various aspects of the techniques of this disclosure relate to configuring user equipment (UE) and base stations to support reference signal processing during an inactive time of a discontinuous reception (DRX) mode. For example, the described techniques may provide for a UE to operate a according to a DRX mode according to a wakeup signal (WUS). The DRX mode may include an active time and an inactive time. The UE may send capability information to a base station, where the capability information indicates the capability of the UE to process reference signal information during a DRX inactive time. In this context, processing the reference signal information may include processing a reference signal and/or processing a reference signal report. For example, processing a reference signal may include sending a sounding reference signal (SRS) and/or receiving a channel state information reference signal (CSI-RS). Processing a reference signal report may include performing measurements on a CSI-RS, generating a CSI-RS report, and/or sending a CSI-RS report.

In general, the capability of the UE to process reference signal information during the DRX inactive time is based on a time duration available during the DRX inactive time. The time duration available may be based on various considerations, including a duration of the DRX inactive time, a time period between the DRX active time and a transmission or a reception of the reference signal, sleep parameters for the UE, an indication to skip physical downlink control channel (PDCCH) reception, an indication to move to a lower power state, a next DRX active time, and/or a WUS monitoring occasion of a next DRX cycle.

Based on the capability information, the base station may send a configuration to the UE that specifies how the UE is to process the reference signal information during the DRX inactive time. The UE may then process the reference signal information during the DRX inactive time in accordance with the configuration. That is, the UE may process reference signal information during the DRX inactive time in certain circumstances (e.g., if the time duration available meets the conditions specified in the configuration). As such, the UE may provide reference signal processing during the DRX inactive time to improve reliability and throughput.

Particular aspects of the subject matter described in this disclosure may be implemented to realize one or more of the following potential advantages, among others. The techniques employed by the UE may provide benefits and enhancements to the operation of the UE. For example, operations performed by the UE may provide improvements to directional communications when operating in 5G systems. By maintaining directional communication beams for receiving a WUS, the UE may reduce power consumption by decreasing latency related to receiving the WUS and, as a result, may also improve the reliability of the directional communications.

Additionally or alternatively, configuring the UE to process reference signals during a DRX inactive time may provide improvements to beam management for the UE. For example, configuring the UE to process reference signals during a DRX inactive time may provide for enhanced reference signal operations compared to some wireless communications systems in which reference signal operations over the DRX active time may be unsatisfactory. The processing of reference signals during a DRX inactive time may improve reference signal reporting and/or transmission in the DRX cycle by decreasing latency related reference signal reporting and/or transmission, and thereby promote enhanced efficiency for directional communications between the UE and a base station. The improvements to the efficiency of reference signal processing may promote improved spectral efficiency and higher data rates. The described techniques may thereby promote enhanced efficiency and throughput for beam operations in wireless communications systems, among other benefits.

In one example, this disclosure describes a first network entity for wireless communication, the first network entity comprising a memory and at least one processor coupled to the memory. The at least one processor is configured to operate according to a connected DRX mode based on a WUS, wherein the connected DRX mode includes a DRX active time and a DRX inactive time. The at least one processor may send, to a second network entity, capability information of the first network entity to process, during the DRX inactive time, reference signal information, wherein the reference signal information includes one or more of: a reference signal or a reference signal report. The at least one processor may receive, from the second network entity, a configuration based on the capability information, wherein the configuration specifies how the first network entity is to process the reference signal information during the DRX inactive time. The at least one processor may process the reference signal information during the DRX inactive time in accordance with the configuration.

In another example, this disclosure describes a first network entity for wireless communication, the first network entity comprising a memory and at least one processor coupled to the memory. The at least one processor is configured to instruct a second network entity to operate according to a connected DRX mode based on a WUS, wherein the connected DRX mode includes a DRX active time and a DRX inactive time. The at least one processor may receive, from the second network entity, capability information of the second network entity to process, during the DRX inactive time, reference signal information, wherein the reference signal information includes one or more of: a reference signal or a reference signal report. The at least one processor may send, to the second network entity, a configuration based on the capability information, wherein the configuration specifies how the second network entity is to process the reference signal information during the DRX inactive time.

In another example, this disclosure describes a method for wireless communication, the method comprising operating according to a connected DRX mode based on a WUS, wherein the connected DRX mode includes a DRX active time and a DRX inactive time, sending, to a second network entity, capability information of the first network entity to process, during the DRX inactive time, reference signal information, wherein the reference signal information includes one or more of: a reference signal or a reference signal report, receiving, from the second network entity, configuration based on the capability information, wherein the configuration specifies how the first network entity is to process the reference signal information during the DRX inactive time, processing the reference signal information during the DRX inactive time in accordance with the configuration.

In another example, this disclosure describes a method for wireless communication, the method comprising instructing a second network entity to operate according to a connected DRX mode based on a WUS, wherein the connected DRX mode includes a DRX active time and a DRX inactive time, receiving, from the second network entity, capability information of the second network entity to process, during the DRX inactive time, reference signal information, wherein the reference signal information includes one or more of: a reference signal or a reference signal report, and sending, to the second network entity, a configuration based on the capability information, wherein the configuration specifies how the second network entity is to process the reference signal information during the DRX inactive time.

In another example, this disclosure describes an apparatus for wireless communication, the apparatus comprising means for operating according to a connected DRX mode based on a WUS, wherein the connected DRX mode includes a DRX active time and a DRX inactive time, means for sending, to a second network entity, capability information of the first network entity to process, during the DRX inactive time, reference signal information, wherein the reference signal information includes one or more of: a reference signal or a reference signal report, means for receiving, from the second network entity, configuration based on the capability information, wherein the configuration specifies how the first network entity is to process the reference signal information during the DRX inactive time, means for processing the reference signal information during the DRX inactive time in accordance with the configuration.

In another example, this disclosure describes an apparatus for wireless communication, the apparatus comprising means for instructing a second network entity to operate according to a connected DRX mode based on a WUS, wherein the connected DRX mode includes a DRX active time and a DRX inactive time, means for receiving, from the second network entity, capability information of the second network entity to process, during the DRX inactive time, reference signal information, wherein the reference signal information includes one or more of: a reference signal or a reference signal report, and means for sending, to the second network entity, a configuration based on the capability information, wherein the configuration specifies how the second network entity is to process the reference signal information during the DRX inactive time.

In another example, this disclosure describes a non-transitory computer-readable storage medium storing instructions that, when executed, cause a programmable processor to operate according to a connected DRX mode based on a WUS, wherein the connected DRX mode includes a DRX active time and a DRX inactive time, send, to a second network entity, capability information of the first network entity to process, during the DRX inactive time, reference signal information, wherein the reference signal information includes one or more of: a reference signal or a reference signal report, receive, from the second network entity, configuration based on the capability information, wherein the configuration specifies how the first network entity is to process the reference signal information during the DRX inactive time, and process the reference signal information during the DRX inactive time in accordance with the configuration.

In another example, this disclosure describes a non-transitory computer-readable storage medium storing instructions that, when executed, cause a programmable processor to instruct a second network entity to operate according to a connected DRX mode based on a WUS, wherein the connected DRX mode includes a DRX active time and a DRX inactive time, receive, from the second network entity, capability information of the second network entity to process, during the DRX inactive time, reference signal information, wherein the reference signal information includes one or more of: a reference signal or a reference signal report, and send, to the second network entity, a configuration based on the capability information, wherein the configuration specifies how the second network entity is to process the reference signal information during the DRX inactive time.

These and other aspects of the technology discussed herein will become more fully understood upon a review of the detailed description, which follows. Other aspects and features will become apparent to those of ordinary skill in the art, upon reviewing the following description of specific examples in conjunction with the accompanying figures. While the following description may discuss various advantages and features relative to certain examples, implementations, and figures, all examples can include one or more of the advantageous features discussed herein. In other words, while this description may discuss one or more examples as having certain advantageous features, one or more of such features may also be used in accordance with the other various examples discussed herein. In similar fashion, while this description may discuss certain examples as devices, systems, or methods, it should be understood that such examples of the teachings of the disclosure can be implemented in various devices, systems, and methods.

BRIEF DESCRIPTION OF DRAWINGS

FIG. 5 illustrates an example UE power consumption model for frequency range 1.

FIG. 6 illustrates an example UE power consumption model for frequency range 2.

FIG. 7 illustrates an example UE power consumption during state transition.

6

Figure 1:
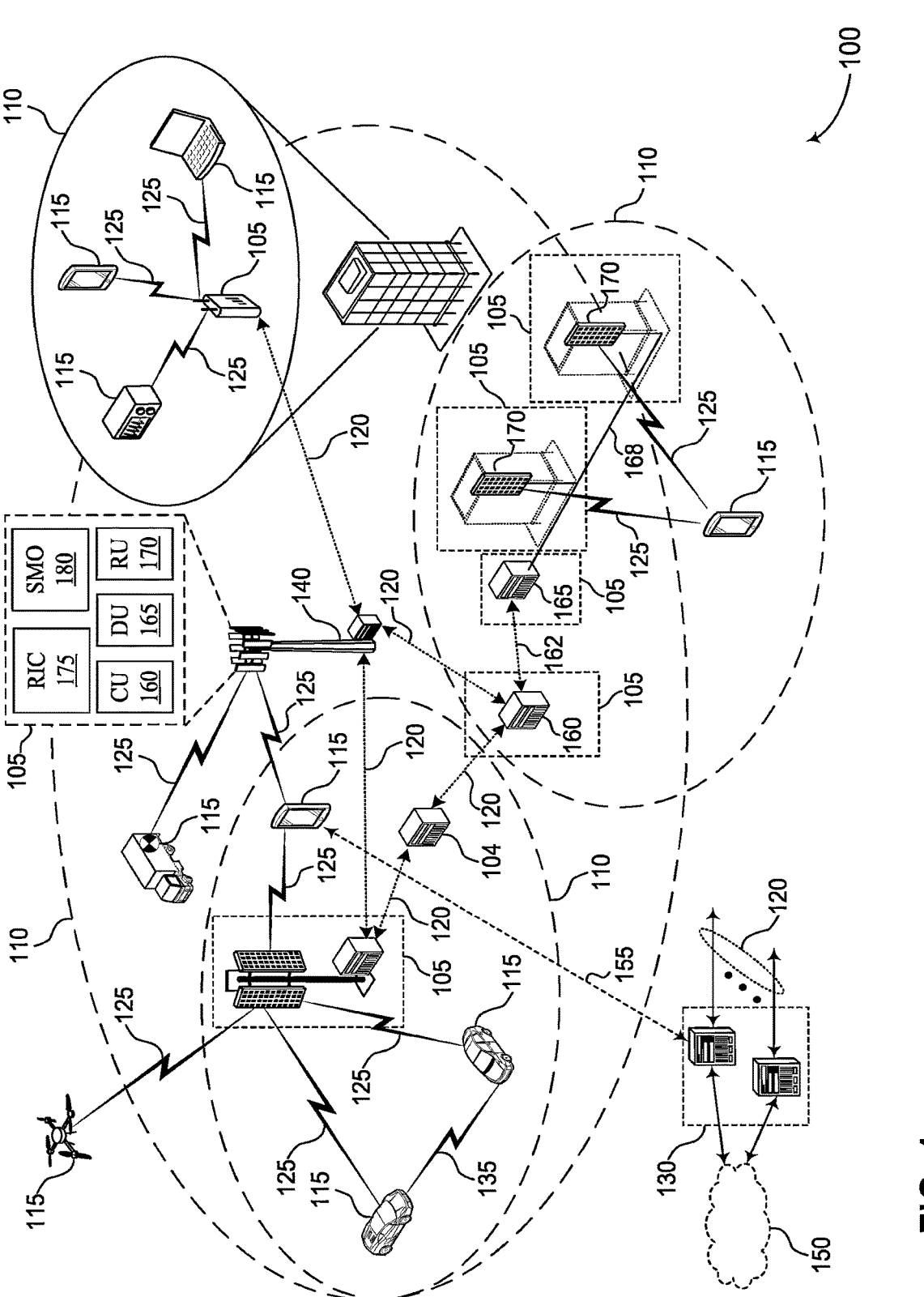
FIG. 1 illustrates an example of a wireless communications system that supports reference signal processing during a DRX inactive time in accordance with one or more aspects of the present disclosure.

FIG. 15 is a flowchart illustrating an example of a process for reference signal processing during a DRX inactive time according to some aspects of this disclosure.

FIG. 16 is a flowchart illustrating another example of a process for reference signal processing during a DRX inactive time according to some aspects of this disclosure.

DETAILED DESCRIPTION

Wireless communications systems may include multiple communication devices such as user equipment (UEs) and base stations (e.g., network entities), which may provide wireless communication services to the UEs. For example, such base stations may be next-generation NodeBs or giga-NodeBs (either of which may be referred to as a gNB) that may support multiple radio access technologies (RATs) including fourth generation (4G) systems, such as Long Term Evolution (LTE) systems, as well as fifth generation (5G) systems, which may be referred to as New Radio (NR) systems. Some UEs may support reference signal transmission, reception, and reporting.

As on example, a UE may be configured to send a sounding reference signal (SRS) to a base station. The base station uses the SRS to determine the channel quality of the uplink path between the UE and the base station and makes resource allocation decisions based on the determined uplink channel quality. As another example, a UE may receive a channel state information (CSI) reference signal (CSI-RS) from the base station. The UE may perform measurements on the CSI-RS and send a CSI-RS report back to the base station. The CSI-RS report includes various radio channel quality measures of the downlink path. The base station uses the CSI-RS report to determine the channel quality of the downlink path between the UE and the base station and makes resource allocation decisions based on the determined downlink channel quality.

Some UEs may also support discontinuous reception (DRX) operations. In some examples, a UE may be configured to measure reference signals (e.g., a CSI-RS) transmitted by a base station and to provide CSI-RS reports to the base station exclusively in an active duration of a DRX cycle. The UEs may be configured to support CSI operations, for example in an active duration of a DRX cycle, according to a wakeup signal configuration. Specifically, the UEs may be configured to transmit the CSI-RS reports based on receiving a wakeup signal from the base station in an inactive duration of the DRX cycle.

For example, the UEs may be configured to monitor a pre-wakeup window (also referred to as a wakeup signal monitoring occasion) in an inactive duration of the DRX cycle to receive a wakeup signal. In some examples, if a UE receives a wakeup signal in the wakeup signal monitoring occasion and the wakeup signal indicates that the UE is to wake up, the UE may initiate an active duration of the DRX cycle. Additionally, if the UE is configured to perform CSI-RS reporting in the active duration of the DRX cycle, the UE may transmit CSI-RS reports on periodic or semi-persistent resources, configured by the base station, in the active duration of the DRX cycle. Otherwise, if the UE does not receive a wakeup signal in the wakeup signal monitoring occasion, the UE may elect to not power-on in the active duration of the DRX cycle. As such, the UE may not provide any CSI-RS reports to the base station on the configured periodic or semi-persistent resources in the active duration of the DRX cycle.

As demand for communication efficiency increases, reference signal processing (e.g., CSI-RS reception, CSI-RS reporting, and SRS transmission, among others) may be increasingly important for beam management, among other wireless operations. For example, CSI-RS reporting may enable the maintenance or improvement of a beam link quality between the base station and the UE. Additionally, for UEs operating according to a wakeup signal configuration according to a DRX mode, it may be advantageous to maintain directional communication beams for receiving the wakeup signal to enable power saving, as well as for receiving control information and data with sufficient reliability and throughput. Existing wireless communications systems may fail to provide satisfactory reference signal processing when operating according to a DRX mode in accordance with a wakeup signal configuration. As a result, existing wireless communications systems may be unable to support sufficient beam management, for example, for high reliability and low latency applications.

Various aspects of the described techniques relate to configuring a UE and base station to support reference signal processing during an inactive time of a DRX mode. For example, the described techniques may provide for a UE to operate a according to a DRX mode according to a wakeup signal (WUS). As described above, the DRX mode may include an active time and an inactive time. The UE may send capability information to a base station, where the capability information indicates the capability of the UE to process reference signal information during a DRX inactive time. In this context, processing the reference signal information may include processing a reference signal and/or processing a reference signal report. For example, processing a reference signal may include sending an SRS and/or receiving a CSI-RS. Processing a reference signal report may include performing measurements on a CSI-RS, generating a CSI-RS report, and/or sending a CSI-RS report.

In general, the capability of the UE to process reference signal information during the DRX inactive time is based on a time duration available during the DRX inactive time. The time duration available may be based on various considerations, including a duration of the DRX inactive time, a time period between the DRX active time and a transmission or a reception of the reference signal, sleep parameters for the UE, an indication to skip physical downlink control channel (PDCCH) reception, an indication to move to a lower power state, a next DRX active time, and/or a WUS monitoring occasion of a next DRX cycle.

Based on the capability information, the base station may send a configuration to the UE that specifies how the UE is to process the reference signal information during the DRX inactive time. The UE may then process the reference signal information during the DRX inactive time in accordance with the configuration. That is, the UE may process reference signal information during the DRX inactive time in certain circumstances (e.g., if the time duration available meets the conditions specified in the configuration). As such, the UE may provide reference signal processing during the DRX inactive time to improve reliability and throughput.

Particular aspects of the subject matter described in this disclosure may be implemented to realize one or more of the following potential advantages, among others. The techniques employed by the UE may provide benefits and enhancements to the operation of the UE. For example, operations performed by the UE may provide improvements to directional communications when operating in 5G systems. By maintaining directional communication beams for receiving a wakeup signal, the UE may reduce power consumption by decreasing latency related to receiving the wakeup signal and, as a result, may also improve the reliability of the directional communications.

Additionally or alternatively, configuring the UE to process reference signals during a DRX inactive time may provide improvements to beam management for the UE. For example, configuring the UE to process reference signals during a DRX inactive time may provide for enhanced reference signal operations compared to some wireless communications systems in which reference signal operations over the DRX active time may be unsatisfactory. The processing of reference signals during a DRX inactive time may improve reference signal reporting and/or transmission in the DRX cycle by decreasing latency related reference signal reporting and/or transmission, and thereby promote enhanced efficiency for directional communications between the UE and a base station. The improvements to the efficiency of reference signal processing may promote improved spectral efficiency and higher data rates. The described techniques may thereby promote enhanced efficiency and throughput for beam operations in wireless communications systems, among other benefits.

The disclosure that follows presents various devices and techniques for the transmission, reception, and/or processing of reference signals during a DRX inactive time that may be implemented across a broad variety of telecommunication systems, network architectures, and communication standards. Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to UE beam capabilities given beam configurations in predictive beam management.

FIG. 1 illustrates an example of a wireless communications system 100 that supports reference signal processing during a DRX inactive time in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a network node, a base station, a gNB, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, mobile, or both at different times. In some examples, one or more of UEs 115 may be energy harvesting (EH) devices. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein for reference signal processing during a DRX inactive time. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support the processing of reference signals during a DRX inactive time as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some aspects, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some aspects, the wireless communications system 100 may include network entities 105 or UEs 115 that support concurrent communications using carriers associated with multiple carrier bandwidths. In some aspects, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some aspects, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some aspects, a carrier may support multiple cells, and different cells may be configured according to different protocol types (e.g., MTC, narrowband IoT (NB-IOT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some aspects, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking. Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz).

Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHZ.

The wireless communications system 100 may also operate using a super high frequency (SHF) region, which may be in the range of 3 GHZ to 30 GHZ, also known as the centimeter band, or using an extremely high frequency (EHF) region of the spectrum (e.g., from 30 GHz to 300 GHz), also known as the millimeter band. In some aspects, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some aspects, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHZ industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some aspects, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some aspects, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In accordance with the techniques of this disclosure UEs 115 may support reference signal transmission, reception, and reporting. As on example, a UE 115 may be configured to send a sounding reference signal (SRS) to a network entity 105. network entity 105 may be configured to use the SRS to determine the channel quality of the uplink path between the a UE 115 and the network entity 105. The network entity 105 may make resource allocation decisions based on the determined uplink channel quality. As another example, a UE 115 may receive a channel state information (CSI) reference signal (CSI-RS) from a network entity 105. The UE 115 may perform measurements on the CSI-RS and send a CSI-RS report back to the network entity 105. The CSI-RS report includes various radio channel quality measures of the downlink path. The network entity 105 uses the CSI-RS report to determine the channel quality of the downlink path between the UE 115 and the network entity 105 and makes resource allocation decisions based on the determined downlink channel quality.

Some UEs 115 may also support discontinuous reception (DRX) operations. In some examples, a UE 115 may be configured to measure reference signals (e.g., a CSI-RS) transmitted by a network entity 105. The UE 115 may also be configured to send CSI-RS reports to the network entity 105 exclusively in an active duration of a DRX cycle. The UEs 115 may be configured to support CSI operations, for example in an active duration of a DRX cycle, according to a wakeup signal configuration. Specifically, the UEs 115 may be configured to transmit the CSI-RS reports based on receiving a wakeup signal from the network entity 105 in an inactive duration of the DRX cycle.

Various aspects of the described techniques relate to configuring a UE 115 and a network entity 105 to support reference signal processing during an inactive time of a DRX mode. While the techniques below will be described with reference to communications between a UE and a network entity (e.g., a base station), other examples may be described with reference to two network entities. In some examples, a first network entity and a second network entity are a UE and a base station, and vice versa (e.g., in a gNB to UE communication in a Uu link). In other examples, the first network entity and the second network entity are both UEs (e.g., in sidelink communication). Accordingly, any techniques described below that are performed by network entity 105 (e.g., a base station), may also be performed by another UE in a sidelink communication.

The techniques described below may provide for a UE 115 to operate a according to a DRX mode according to a wakeup signal (WUS). The DRX mode may include an active time and an inactive time. The UE 115 may send capability information to a network entity 105, where the capability information indicates the capability of the UE 115 to process reference signal information during a DRX inactive time. In this context, processing the reference signal information may include processing a reference signal and/or processing a reference signal report. For example, processing a reference signal may include sending an SRS and/or receiving a CSI-RS. Processing a reference signal report may include performing measurements on a CSI-RS, generating a CSI-RS report, and/or sending a CSI-RS report.

In general, the capability of the UE 115 to process reference signal information during the DRX inactive time is based on a time duration available during the DRX inactive time. The time duration available may be based on various considerations, including a duration of the DRX inactive time, a time period between the DRX active time and a transmission or a reception of the reference signal, sleep parameters for the UE 115, an indication to skip physical downlink control channel (PDCCH) reception, an indication to move to a lower power state, a next DRX active time, and/or a WUS monitoring occasion of a next DRX cycle.

Based on the capability information, the network entity 105 may send a configuration to the UE 115 that specifies how the UE 115 is to process the reference signal information during the DRX inactive time. The UE 115 may then process the reference signal information during the DRX inactive time in accordance with the configuration. That is, the UE 115 may process reference signal information during the DRX inactive time in certain circumstances (e.g., if the time duration available meets the conditions specified in the configuration). As such, the UE 115 may provide reference signal processing during the DRX inactive time to improve reliability and throughput.

Particular aspects of the subject matter described in this disclosure may be implemented to realize one or more of the following potential advantages, among others. The techniques employed by the UE 115 may provide benefits and enhancements to the operation of the UE 115. For example, operations performed by the UE 115 may provide improvements to directional communications when operating in 5G systems. By maintaining directional communication beams for receiving a WUS, the UE 115 may reduce power consumption by decreasing latency related to receiving the WUS and, as a result, may also improve the reliability of the directional communications.

Additionally or alternatively, configuring the UE 115 to process reference signals during a DRX inactive time may provide improvements to beam management for the UE 115. For example, configuring the UE 115 to process reference signals during a DRX inactive time may provide for enhanced reference signal operations compared to some wireless communications systems in which reference signal operations over the DRX active time may be unsatisfactory. The processing of reference signals during a DRX inactive time may improve reference signal reporting and/or transmission in the DRX cycle by decreasing latency related reference signal reporting and/or transmission, and thereby promote enhanced efficiency for directional communications between the UE 115 and a network entity 105. The improvements to the efficiency of reference signal processing may promote improved spectral efficiency and higher data rates. The described techniques may thereby promote enhanced efficiency and throughput for beam operations in wireless communications systems, among other benefits.

In one example, a UE 115 may be configured to operate according to a connected DRX mode based on a WUS. The connected DRX mode includes a DRX active time and a DRX inactive time. UE 115 may send, to a network entity 105, capability information of the UE 115 to process, during the DRX inactive time, reference signal information. The reference signal information includes one or more of: a reference signal or a reference signal report. UE 115 may receive, from the network entity 105, a configuration based on the capability information, wherein the configuration specifies how the UE 115 is to process the reference signal information during the DRX inactive time. UE 115 may process the reference signal information during the DRX inactive time in accordance with the configuration.

In another example, network entity 105 instruct a UE 115 to operate according to a connected DRX mode based on a WUS. The network entity 105 may receive, from the UE 115, capability information of the UE 115 to process, during the DRX inactive time, reference signal information. Again, the reference signal information includes one or more of: a reference signal or a reference signal report. The network entity 105 may send, to the UE 115, a configuration based on the capability information, wherein the configuration specifies how the UE 115 is to process the reference signal information during the DRX inactive time.

Figure 2:
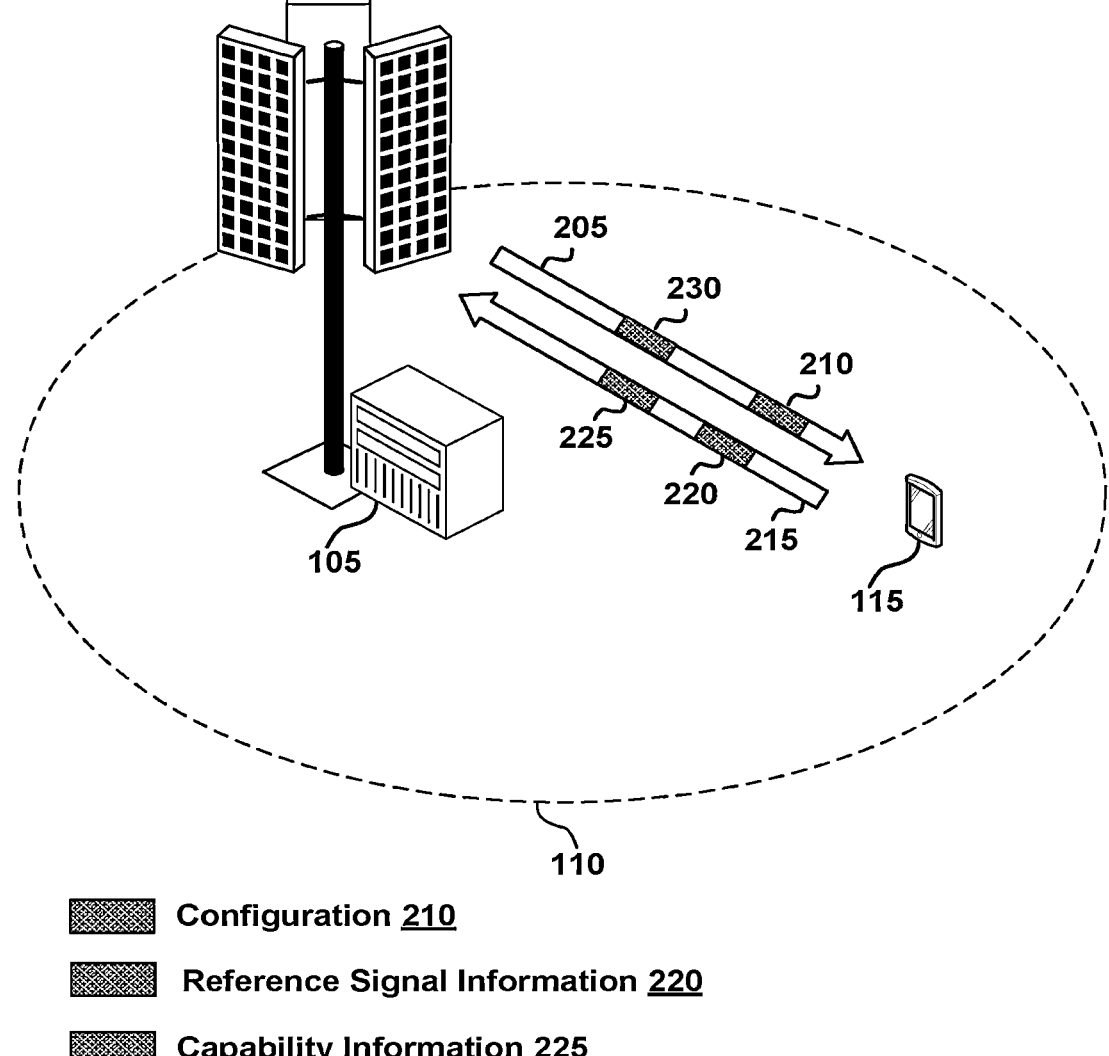
FIG. 2 illustrates another example of a wireless communications system that supports reference signal processing during a DRX inactive time in accordance with one or more aspects of the present disclosure.

FIG. 2 illustrates an example of a wireless communications system 200 that supports reference signal transmission, reception and reporting when operating according to DRX mode in accordance with aspects of the present disclosure. In some examples, the wireless communications system 200 may implement aspects of the wireless communications system 100. For example, the wireless communications system 200 may include a network entity 105 and a UE 115 within a geographic coverage area 110. The network entity 105 and the UE 115 may be examples of the corresponding devices described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support improvements to power consumption, spectral efficiency, higher data rates and, in some examples, may promote enhanced efficiency for high reliability and low latency reference signal reception, transmission, and/or reporting over DRX operations, including during a DRX inactive time, among other benefits.

The network entity 105 and the UE 115 may be configured with multiple antennas, which may be used to employ techniques such as transmit diversity, receive diversity, multiple-input multiple-output communications, or beamforming, or any combination thereof. The antennas of the network entity 105 and the UE 115 may be located within one or more antenna arrays or antenna panels, which may support multiple-input multiple-output operations or transmit or receive beamforming. For example, the network entity 105 antennas or antenna arrays may be co-located at an antenna assembly, such as an antenna tower. In some examples, antennas or antenna arrays associated with the network entity 105 may be located in diverse geographic locations. The network entity 105 may have an antenna array with a number of rows and columns of antenna ports that the network entity 105 may use to support beamforming of communications with the UE 115. Likewise, the UE 115 may have one or more antenna arrays that may support various multiple-input multiple-output or beamforming operations. Additionally or alternatively, an antenna panel may support radio frequency beamforming for a signal transmitted via one or more antenna ports. The network entity 105 and the UE 115 may thus be configured to support directional communications using the multiple antennas.

The UE 115, in the wireless communications system 200, may support various radio resource control (RRC) modes to preserve resources (for example, time and frequency resources of the wireless communications system 200), a battery life of the UE 115, among other examples. An RRC mode may include one or more of an RRC connected mode, an RRC idle mode, or an RRC inactive mode. In the RRC connected mode, the UE 115 may have an active connection with the network entity 105 and operate according to a first power mode (for example, a normal power mode). DRX operation during an RRC connected mode may be referred to as a connected DRX mode. In the RRC inactive mode, the UE 115 may also have an active connection with the network entity 105 but may operate according to a second power mode (for example, a low power mode). In the RRC idle mode the UE 115 may not have an active connection with the network entity 105 and thus may operate according to a third power mode (for example, a lower power mode compared to the RRC inactive mode).

The UE 115 may be configured to support DRX operations for directional communications using the multiple antennas while operating in an RRC. For example, in the RRC connected mode, connected DRX operations can yield power savings by allowing the UE 115 to power down for one or more durations, as directed by the network entity 105. In the RRC idle mode or in the RRC inactive mode, DRX operations can be used to further extend the time the UE 115 spends in a lower power mode. DRX operations therefore offer improvement on resource utilization as well as power saving for the UE 115. In some examples, the UE 115 may be configured to also support CSI operations to further offer improvement to power savings and operations for the UE 115. For example, the UE 115 may be configured to support CSI operations to manage or improve directional communications between the network entity 105 and the UE 115.

The operations performed by the network entity 105 and the UE 115, for example, may provide improvements to directional operations in the wireless communications system 200. Furthermore, the operations performed by the network entity 105 and the UE 115 may provide benefits and enhancements to the operation of the UE 115. For example, by supporting CSI reporting over a DRX inactive time in the wireless communications system 200, various operational characteristics, such as power consumption, may be reduced. The operations performed by the network entity 105 and the UE 115 may also promote efficiency of the UE 115 by reducing latency associated with processes related to high reliability and low latency directional communications operations (such as, beam management operations).

Figure 3:
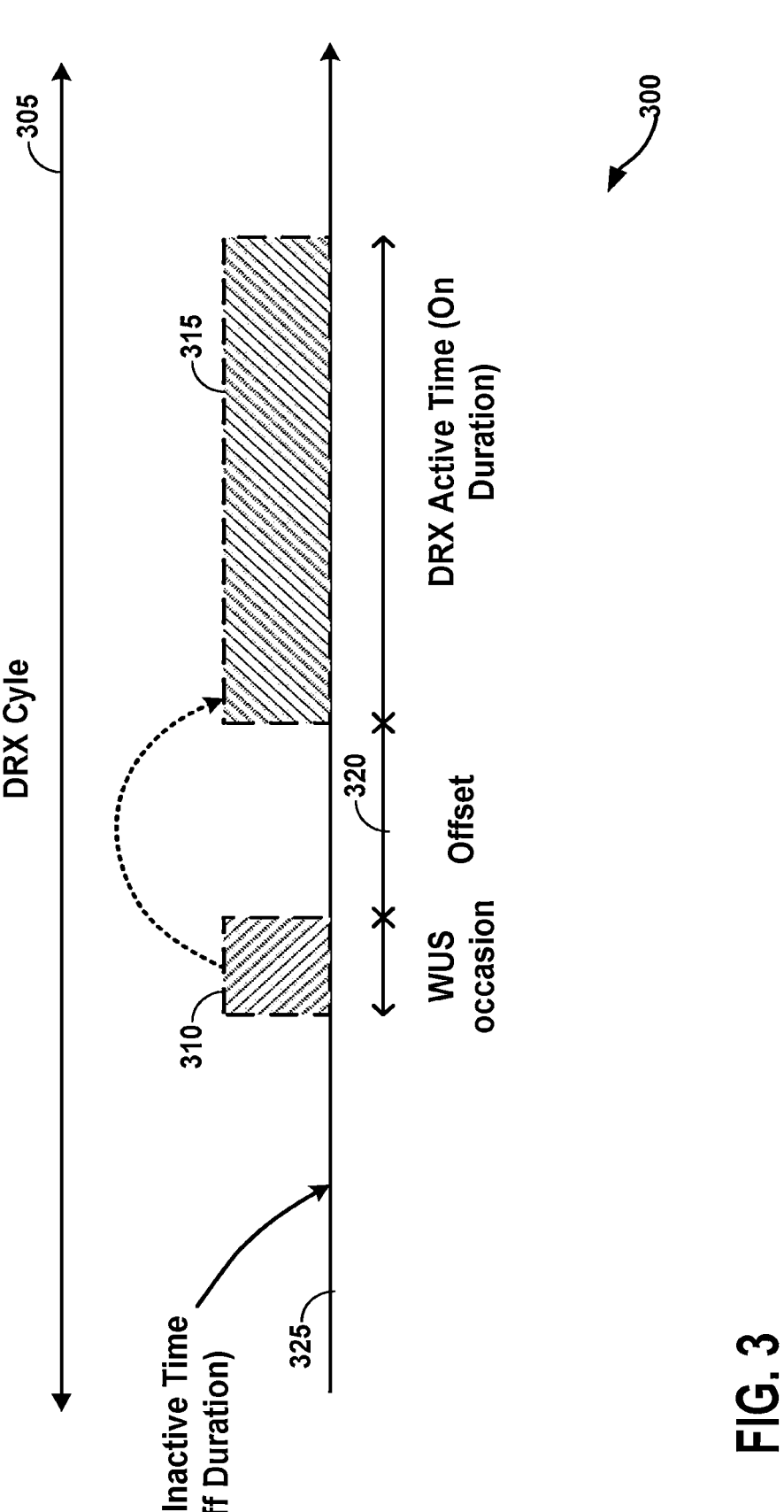
FIG. 3 illustrates an example of timelines that support reference signal reporting over DRX operations in accordance with aspects of the present disclosure.

FIG. 3 illustrates an example of a timeline 300 that supports reference signal processing over DRX operations in accordance with aspects of the present disclosure. In some examples, the timeline 300 may be implemented by aspects of the wireless communications system 100 and 200, as described with reference to FIGS. 1 and 2. For example, the timeline 300 may be based on a configuration by a network entity 105 or a UE 115 and may be implemented by the UE 115. In the example illustrated in FIG. 3, the timeline 300 is applicable to implementations or instances when the UE 115 is configured with reference signal processing capabilities over connected DRX (C-DRX) operations in 5G systems.

The timeline 300 may include a DRX cycle 305 (e.g., one DRX period), which may correspond to time resources (for example, a symbol duration, a slot duration, a subframe duration, a frame duration), as well as frequency resources (for example, subcarriers, carriers). The timeline 300 may also include a WUS occasion 310 (also referred to as a wakeup signal monitoring occasion) and a DRX active time 315 (also referred to as a DRX ON duration). The WUS occasion 310 and the DRX active time 315 may be separated by a time offset 320. The WUS occasion 310, or the DRX active time 315, or both may also correspond to time and frequency resources. For example, the WUS occasion 310 and the DRX active time 315 may correspond to a number of subframe cycles, with each subframe in a cycle having a subframe index, that may, for example, range from 0 to 9. Each subframe cycle or subframe index or both may relate to one or more symbols and subcarriers.

With reference to FIGS. 1 and 2, the network entity 105 may configure the UE 115 with a WUS occasion 310 to preserve resources (for example, time and frequency resources) or a battery life of the UE 115, among other advantages. For example, the WUS occasion 310 may facilitate power saving advantages of the UE 115 by reducing unnecessary wakeup occasions for the UE 115. If the UE 115 receives a WUS during the WUS occasion 310, the UE 115 enters the DRX Active time 315, e.g., by starting a DRX on duration timer. The UE 115 may be configured to monitor for a PDCCH during the DRX active time 315. If the UE 115 does not receive a WUS during WUS occasion 310, the UE 115 may skip the DRX active time 315. For example, the UE 115 may remain in DRX inactive time 325 (also referred to as a DRX OFF duration), and the UE 115 may enter into, and/or remain in, one or more sleep modes.

Referring back to FIG. 2, while monitoring the WUS occasion 310 in the DRX cycle 305, the UE 115 may receive, from a network entity 105, a WUS that may carry an indication of an active time 315 of the DRX cycle 305 for the UE 115. For example, with reference to FIGS. 1 and 2, the network entity 105 may transmit, to the UE 115, a WUS 310 in the WUS occasion via the one or more directional beams 205 (for example, downlink directional beams). The UE 115 may receive the WUS 310 in the WUS occasion via the one or more directional beams 205 (for example, downlink directional beams). In some examples, the network entity 105 transmits the WUS 310 via PDCCH. The WUS 310 may indicate whether the UE 115 is to wake up for a duration of a DRX cycle. For example, the WUS 310 may provide an indication for the UE 115 to wake up in the DRX active time 315 (FIG. 3) associated with the DRX cycle 305 to receive directional communications, for example, control information, or data, or both from the network entity 105.

With reference to FIGS. 1 and 2, and in accordance with the timeline 300 of FIG. 3, the network entity 105 may not transmit, in the WUS occasion 310, the WUS 310 to the UE 115 via the one or more directional beams 205 (for example, downlink directional beams). Here, the UE 115 may refrain from powering on in the DRX active time 315 of the DRX cycle 305 because the absence of the WUS 310 may be an indication to the UE 115 that there are no upcoming communications (for example, control information or data, or both) from the network entity 105, and thereby the UE 115 may experience power savings.

For example, the UE 115 may not monitor a downlink control channel (for example, a PDCCH in the DRX active time 315 when a WUS is not received in the WUS occasion 310. In other words, in some examples, the UE 115 may exclusively monitor a downlink control channel (for example, a PDCCH) in the DRX active time 315 when the UE 115 receives a WUS (for example, the WUS 310). Otherwise, the DRX active time 315 can be skipped. While in the DRX inactive time 325, the UE 115 may enter a low power mode, and thereby further reduce power consumption. The UE 115 may exit the low power mode in the DRX active time 315 of the DRX cycle 305. In some examples, the UE 115 may enter a low power mode when skipping the DRX active time 315, and thereby further reduce power consumption.

In some examples, the UE 115 may be configured to support reference signal operations, such as CSI-RS and/or SRS operations to further offer improvement to power savings and operations for the UE 115, as well as for managing directional communications between the network entity 105 and the UE 115. For example, the network entity 105 may transmit a reference signal (for example, a CSI-RS) to the UE 115. The UE 115 may provide feedback to the network entity 105 in the form of a CSI-RS report. In general, the CSI-RS report may include one or more measurements of the CSI-RS that indicates the downlink channel quality between the network entity 105 and the UE 115. In some example, the UE 115 may be configured to perform a signal-to-interference noise ratio (SINR) measurement of the CSI-RS. The CSI-RS report may include one or more of a channel quality indicator (CQI), a precoding matrix indictor (PMI), a layer indicator (LI), and/or a rank indicator (RI). In general, the contents of the CSI-RS report may be referred to as CSI-RS information. The network entity 105 may use the CSI-RS report, including the PMI and/or other codebook-based feedback (for example, a multi-panel type codebook, a linear combination type codebook, a port selection type codebook) for beam selection. Although these techniques are described with reference to signals transmitted in one or more directions by the network entity 105, the UE 115 may employ similar techniques for transmitting signals multiple times in different directions (for example, for determining a beam direction for subsequent transmission or reception by the UE 115) or for transmitting a signal in a single direction (for example, for transmitting data to a receiving device).

In some examples, the UE 115 may be configured to receive and measure the CSI-RS and provide a CSI report exclusively in an active duration of a DRX cycle. For example, the UE 115 may be configured to provide the CSI report exclusively in the DRX active time 315 of the DRX cycle 305. In some other examples, the UE 115 may be configured to support CSI operations according to a WUS configuration. That is, the UE 115 may be configured to transmit a CSI report based on a reception of a WUS (such as, the WUS 310) in a DRX cycle. For example, if the UE 115 is configured to provide a CSI report, the UE 115 may transmit the CSI report on configured periodic or semi-persistent resources in the DRX active time 315 of the DRX cycle 305, based on a reception of the WUS 310. Otherwise, if the UE 115 does not receive the WUS 310 (for example, in the WUS occasion 310), the UE 115 may not power on in the DRX active time 315 of the DRX cycle 305 to transmit CSI reports. As such, the UE 115 does not provide any CSI-RS reports on the configured periodic or semi-persistent resources in the DRX active time 315 of the DRX cycle 305.

In other examples, such as those described in co-pending U.S. Patent Publication 2021/0153054, the UE 115 may be configured to receive and measure the CSI-RS and provide a CSI report exclusively in an active duration of a DRX cycle even if a WUS is not received. This technique allows for more frequent measuring and reporting of a CSI-RS during a DRX active time, even if a WUS is not received. For example, when operating according to a connected DRX mode based on a WUS, the UE 115 may be configured to measure a CSI-R and provide periodic CSI-RS reports during the configured DRX active time, even if the DRX duration timer is not started (e.g., no WUS is received).

In addition to the CSI-RS processing described above, the UE 115 may also be configured to send an SRS to a network entity 105. The network entity 105 uses the SRS to determine the channel quality of the uplink path between the UE 115 and the network entity 105 and makes resource allocation decisions, including channel pre-coding, based on the determined uplink channel quality. In some examples, when the UE 115 is configured to operate according to a DRX mode, the UE 115 may be configured to send an SRS in a periodic or semi-persistent fashion only during a DRX active time. If a WUS is configured for the DRX mode, and the UE 115 does not receive a WUS, the UE 115 will not enter the DRX active time and will not send an SRS to the network entity 105.

In some cases, as an alternative to CSI-RS reporting, the network entity 105 may be configured to use the SRS, instead of a CSI-RS report, to acquire channel state information. Using an SRS to acquire channel state information may be beneficial when there is downlink (DL) and uplink (UL) reciprocity. DL-UL reciprocity is a state where the channel characteristics of both the DL path and the UL path are essentially the same. As such, rather than using the CSI-RS report, which is a measure of the channel quality of the DL path, the network entity may estimate the channel quality of the DL path from the SRS, which is indicative of the channel quality of the UL path.

From the perspective of the UE 115, using the SRS to estimate DL path channel quality is more power efficient, as the CSI-RS measurement, calculation of CQI, RI, PMI, and LI, and reporting may be skipped in some circumstances. When the network entity 105 is configured to estimate the channel quality of the DL path using the SRS, the UE 115 may only need to send the SRS. Any calculations would be performed by the network entity 105.

Even in situations that lack UL-DL reciprocity, and the network entity 105 does not uses the SRS to estimate the DL channel quality, the network entity 105 may still use the SRS to determine UL channel quality to schedule UL channels. However, as discussed above, when the UE 115 is configured to operating according to a DRX mode based on a WUS, the opportunities for sending an SRS may be limited, such as only during a DRX active time when a WUS has been received. As such, the performance of link and/or beam management by the network entity 105 may be degraded.

As demand for communication efficiency increases, reference signal processing, including CSI-RS and SRS processing, may be important for beam management (for example, for the directional beams 205 or directional beams 215 of FIG. 2, or both). For example, a CSI-RS reports and/or an SRS may be important to maintain or improve a beam link quality between the network entity 105 and the UE 115. In some examples, when the UE 115 is configured to operate according a WUS configuration on a connected DRX mode, maintaining directional communication beams for the WUS 310 may be beneficial for power saving and reliability for the network entity 105 and the UE 115. In addition, maintaining the directional communication beams for the network entity 105 and the UE 115 may be beneficial for receiving control information and data to improve reliability and throughput for the network entity 105 and the UE 115.

In order to further improve reference signal processing when operating according to a DRX mode based on a WUS, this disclosure describes techniques for processing reference signals during a DRX inactive time. The techniques of this disclosure may be used in conjunction with any other techniques for reference signal processing during a DRX active time, whether or not a WUS is received. This disclosure describes techniques for determining when a reference signal may be processed during a DRX inactive time. This disclosure also describes techniques for cancelling and/or resuming the processing of reference signals during the DRX inactive time.

In general, the UE 115 may be configured to send capability information to the network entity 105 that indicates that capability of the UE 115 to process reference signal information. In this context, the reference signal information includes both the reference signal itself (e.g., CSI-RS and/or SRS), and/or the generation and/or reporting of a reference signal report (e.g., CSI-RS report). In one or more of the examples described below, the capability of the UE 115 to process reference signal information during the DRX inactive time is based on a time duration available during the DRX inactive time. The time duration available may be based on various considerations, including a duration of the DRX inactive time, a time period between the DRX active time and a transmission or a reception of the reference signal, sleep parameters for the UE, an indication to skip PDCCH reception, an indication to move to a lower power state, a next DRX active time, and/or a WUS monitoring occasion of a next DRX cycle.

Based on the capability information, the network entity 105 may send a configuration to the UE 115 that specifies how the UE 115 is to process the reference signal information during the DRX inactive time. The UE 115 may then process the reference signal information during the DRX inactive time in accordance with the configuration. That is, the UE 115 may process reference signal information during the DRX inactive time in certain circumstances (e.g., if the time duration available meets the conditions specified in the configuration). As such, the UE 115 may provide reference signal processing during the DRX inactive time to improve reliability and throughput.

Returning to FIG. 2, as described above, the UE 115 may be configured to operate according to a connected DRX mode based on a WUS, wherein the connected DRX mode includes a DRX active time and a DRX inactive time. The UE 115 may be configured to send, to a network entity 105, capability information 225 of the UE 115 to process, during the DRX inactive time, reference signal information. The reference signal information may include one or more of a reference signal (e.g., a CSI-RS, an SRS, or other reference signal) or a reference signal report (e.g., a CSI-RS report). The UE 115 may send the capability information 225 to the network entity 105 during a random access channel (RACH) with network entity 105 (e.g., via msg1 or msg3). RACH is initial access and configuration to acquire uplink synchronization and specified identification (id) for radio communications. In another example, the UE 115 may send the capability information 225 to the network entity 105 in response to a capability inquiry from network entity 105. In other examples, the UE 115 may send the capability information 225 to the network entity 105 in one or more of user assistance information in an RRC signaling, layer 1 (L1) signaling (e.g., in uplink control information (UCI)), layer 2 (L2) signaling (e.g., in media access control-control element (MAC-CE)), and/or layer 3 (L3) signaling (e.g., in RRC).

The capability information 225 may include one or more different capabilities to process the reference signal information. For example, the capability information 225 may include information indicative of a first capability of the UE 115 to send an SRS during the DRX inactive time. In another example, the capability information 225 may include information indicative of a second capability of the UE 115 to receive a CSI-RS during the DRX inactive time. The capability information 225 may also include information indicative of a third capability of the UE 115 to generate a CSI-RS report during the DRX inactive time. Generating the CSI-RS report may include one or more of measuring the CSI-RS and calculating one or more measurements for including in the CSI-RS report, wherein the measurements may include an SINR, a CQI, a PMI), an LI, and/or an RI, as described above. In general, the measurement and the CSI-RS and the generation of the CSI-RS reporting may be generally referred to as processing the CSI-RS.

The capability information 225 may further include information indicative of a fourth capability of the UE 115 to send the CSI-RS report during the DRX inactive time. In some examples, an indication of a capability to send the CSI-RS report during the DRX inactive time includes the inherent indication that the UE 115 is also capable of processing the CSI-RS (e.g., measuring the CSI-RS and calculating the measurements to generate the report) during the DRX inactive time.

In another example, the capability information 225 may include information indicative of a firth capability of the UE 115 to buffer the CSI-RS during the DRX inactive time and send the CSI-RS report during the DRX active time. In this example, the UE 115 indicates a capability to receive the CSI-RS during the DRX inactive time, but not process the CSI-RS during the DRX inactive time. Instead, the UE 115 indicates a capability to buffer (e.g., store in memory) the CSI-RS and then process the buffered CSI-RS during a DRX active time (e.g., the next DRX active time).

In another example, the capability information 225 may include information indicative of a sixth capability of the UE 115 to buffer CSI-RS samples during the DRX inactive time and send the CSI-RS report at a specified time. In this example, the UE 115 indicates a capability to receive the CSI-RS during the DRX inactive time, but not process the CSI-RS during the DRX inactive time. Instead, the UE 115 indicates a capability to buffer (e.g., store in memory) the CSI-RS and then process the buffered CSI-RS at a specific time. The specific time may be predetermined (e.g., X number of time units) and/or may be specified by the network entity 105 in in or more of RRC, MAC-CE, and/or downlink control information (DCI) signaling.

In another example, the capability information 225 may include information indicative of a seventh capability of the UE 115 to buffer CSI-RS samples during the DRX inactive time and send the CSI-RS report based on a request from the from the network entity 105. In some examples, the UE 115 may indicate time duration in which UE 115 may buffer the CSI-RS samples. The request from the network entity 105 must come before expiration of the time duration. If not, the UE 115 may discard the CSI-RS samples and not send a CSI-RS report based on the discard CSI-RS samples.

The UE 115 may be configured to send capability information 225 that includes any combination of the capabilities described above. In addition, each of the capabilities described above may be based on one or more conditions, as will be described in more detail below.

Based on the capability information 225, the network entity 105 may send a configuration 210 to the UE 115 that specifies how the UE 115 is to process the reference signal information during the DRX inactive time. The network entity 105 may send the configuration 210 to the UE 115 via one or more of L1 signaling (e.g., in DCI), L2 signaling (e.g., in MAC-CE), and/or L3 signaling (e.g., in RRC). UE 115 may then process the reference signal information during the DRX inactive time in accordance with the configuration 210. For example, the UE 115 may receive a reference signal 230 (e.g., a CSI-RS) from the network entity 105 during the DRX inactive time in accordance with the configuration 210. In some examples, UE 115 may send reference signal information 220 to the network entity 105 during the DRX inactive time in accordance with the configuration. The reference signal information 220 may include a CSI-RS report and/or an SRS.

In one example, the reference signal is an SRS. When configured to process the reference signal information 220 during the DRX inactive time in accordance with the configuration 210, the UE 115 may be configured to send the SRS to network entity 105 during the DRX inactive time.

In another example, the reference signal 230 is a CSI-RS. When configured to process the reference signal information 220 during the DRX inactive time in accordance with the configuration 210, the UE 115 is configured to receive the CSI-RS from the network entity 105 during the DRX inactive time.

In another example, the reference signal report is a CSI-RS report. When configured to process the reference signal information 220 during the DRX inactive time in accordance with the configuration 210, the UE 115 is configured to generate, based on the CSI-RS, the CSI-RS report during the DRX inactive time.

In another example, when configured to process the reference signal information 220 in accordance with the configuration 210, the UE 115 is configured to send the CSI-RS report to the network entity 105 during the DRX inactive time.

In another example, the reference signal report is a CSI-RS report. When configured to process the reference signal information 220 in accordance with the configuration 210, the at UE 115 is configured to buffer one or more of the CSI-RS or the CSI-RS report during the DRX inactive time, and send the CSI-RS report to the network entity 105 based on one or more of entering the DRX active time, reaching a specified time, or a request from the second network entity.

In some examples of the disclosure, the capability information discussed above may be based on various sleep modes and/or sleep parameters that the UE 115 may perform during the DRX inactive time. That is, UE 115 may be configured to perform various sleep modes based on the duration of the DRX inactive time. The UE 115 may indicate, in capability information 225, the capability to process the reference signal information 220 based on configured sleep parameter and the duration of the DRX inactive time. In this example, network entity 105 may send measurements. Multiple power states may be defined for each of multiple frequency ranges. For frequency range 1 (FR1), which may be between 410-7,125 MHZ, possible power states may include a deep sleep state, a light sleep state, a micro sleep state, a PDCCH-only state, a synchronization signal block (SSB) or CSI-RS state, a PDCCH+PDSCH (physical data shared channel) state, and a UL state (e.g., long physical uplink control channel (PUCCH) or physical uplink shared channel (PUSCH)). For frequency range 2 (FR2), which may be between 24,250-52,600 MHZ, the power states may include a PDCCH-only state, an SSB or CSI-RS state, a PDCCH+PDSCH state, and a UL state. As shown below in FIG. 5, the deep slate state, the light sleep state, and the micro sleep state are examples of low power sleep states that the UE 115 may enter into during a DRX inactive time. The UE 115 may use the parameters of such low power sleep states, along with the duration of the DRX inactive time, to determine how to process reference signal information during the DRX inactive time.

A reference configuration for power numbers (see FIG. 5) for FR1 is shown in Table 1 below. A reference configuration for power numbers (see FIG. 6) for FR2 is shown in Table 2 below.

TABLE 1

| FR1 Reference Configuration | |
| --- | --- |
| DL | UL |
| TDD, SCS = 30 kHz, 1CC, BW = 100 MHz, PDCCH region of 2 symbols in the beginning of a slot, #BD = 36, #CCE = 56, PDSCH MCS = 256 QAM, 4 × 4 MIMO | SCS = 30 kHz, 1CC, BW = 100 MHz, 1Tx, Power level = 0 dBm and 23 dBm |

TABLE 2

| FR2 Reference Configuration | |
| --- | --- |
| DL | UL |
| TDD, SCS = 120 kHz, 1CC, BW = 100 MHz, PDCCH region of 2 symbols in the beginning of a slot, #BD = 20, #CCE = 32, PDSCH MCS = 64 QAM, 2 × 2 MIMO | SCS = 120 kHz, 1CC, BW = 100 MHz, 1Tx, Power level = 0 dBm and 23 dBm | a configuration 210 that specifies how UE 115 is to process the reference signal information 220 during the DRX inactive time based on the capability of the UE, and further based on sleep mode parameters and/or a duration of the DRX inactive time. Accordingly, the UE 115 may be configured to determine, based on such a configuration and the configured sleep mode parameters and duration of the DRX inactive time, how reference signal information 220 is to be processed during the DRX inactive time. The following describes example sleep mode parameters and how such parameters may effect reference signal information processing.

The UE 115 may operate according to a pre-defined power model. In some examples, the power model may be a simple, slot-based average power model. In other examples, the power model may be more detailed and capture various aspects of the 5G NR standard. A power model may define one or more power states, state transition energy and times, power consumption scaling, and a power consumption model for radio resource management (RRM)

Figure 4:
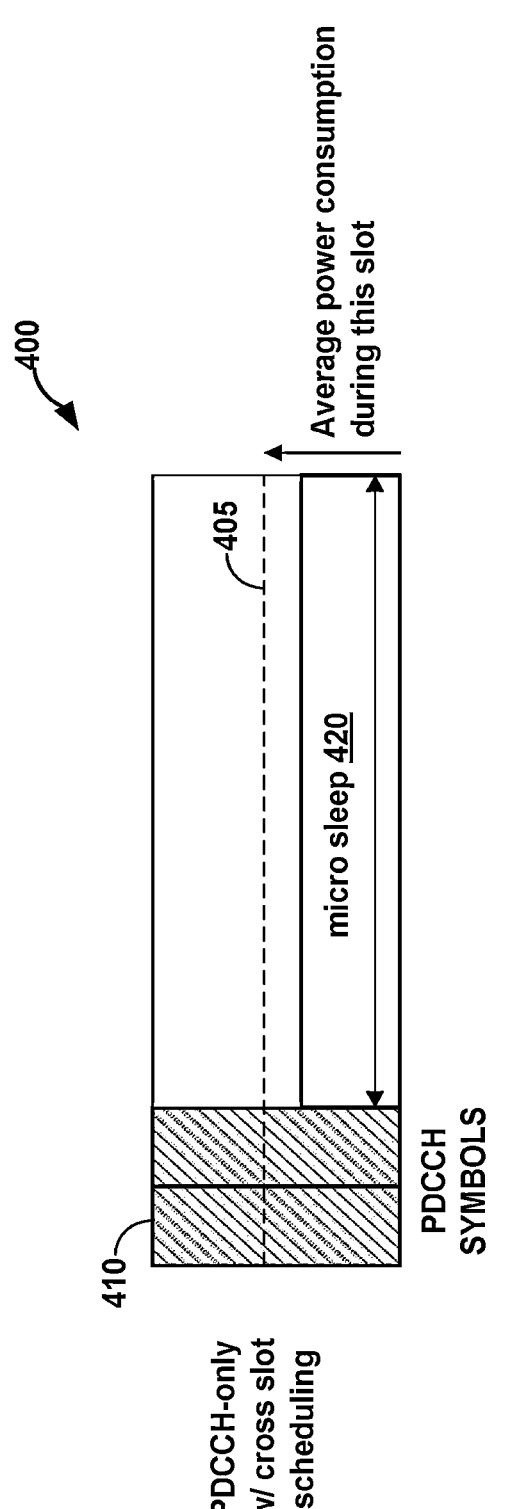
FIG. 4 illustrates an example power consumption of a UE over a slot.

TDD=Time Division Duplexing
SCS=Subcarrier spacing
CC=Component carrier
BW=Bandwidth
PDCCH=physical downlink control channel
BD=Blind decoding
CCE=control channel element
PDSCH MCS=physical downlink shared channel modulation coding scheme
QAM=quadrature amplitude modulation
MIMO=multiple-input multiple-output
Tx=transmitter FIG. 4 shows an example power consumption of a UE 115 over a slot 400. In particular, FIG. 4 shows the average power consumption 405 over a slot 400 that includes both a PDCCH-only power state 410, during which PDCCH symbols are received, and a micro sleep power state 420. The power state described above is specified on a per-slot basis. The power level of the UE 115 operating on FR1 is an average over the operations within a slot. In FIG. 4, the operations include PDCCH-only operations and micro sleep operations (e.g., PDCCH-only with cross slot scheduling).

FIG. 5 illustrates an example UE power consumption model 500 for FR1. FIG. 6 illustrates an example UE power consumption model 600 for FR2. FIG. 5 and FIG. 6 shows the characteristics of each power state as well as the relative power the UE 115 may consume when operating according to each power state.

As shown in FIG. 5, the deep sleep state, light sleep state, and micro sleep state are example low power sleep states that the UE 115 may enter. In examples of this disclosure, the UE 115 may be configured to enter one or more of the low power sleep states during a DRX inactive time. As shown in FIG. 5, each of the low power sleep states may have different characteristics relating the time interval needed to enter the low power sleep state. For example, the UE 115 may be configured to immediately transition to a micro sleep state (e.g., from a non-sleep state or another low power sleep state). In some examples, this may be achieved by powering off fewer components of the UE 115 when entering the micro sleep state. As shown in FIG. 5, the micro sleep state consumes approximately 45 times more power relative to the deep sleep state and over 2 times more power relative to the light sleep state. The UE 115 may require a time interval for the light sleep state and the deep sleep state that is larger than the total transition time for entering and leaving the light sleep state. Transition times will be discussed in more detail below. In general, the deep sleep state may involve powering off more components of the UE 115 relative to light sleep state. Likewise, the light sleep state may involve powering off more components of the UE 115 relative to micro sleep state.

FIG. 7 illustrates an example table 700 showing UE power consumption during state transition. Table 700 shows the additional transition energy used during transition to and from each of the low power sleep states shown in FIG. 5. In addition, table 700 shows examples the total transition time needed to transition to and from each of the lower power sleep states. In general, the longer the sleep state, and the less power used during the sleep state, the longer the transition time is needed. Note that the example power states described herein are just examples, and other sleep states may be used in conjunction with the techniques of this disclosure for reference signal processing during DRX inactive time.

Figure 8:
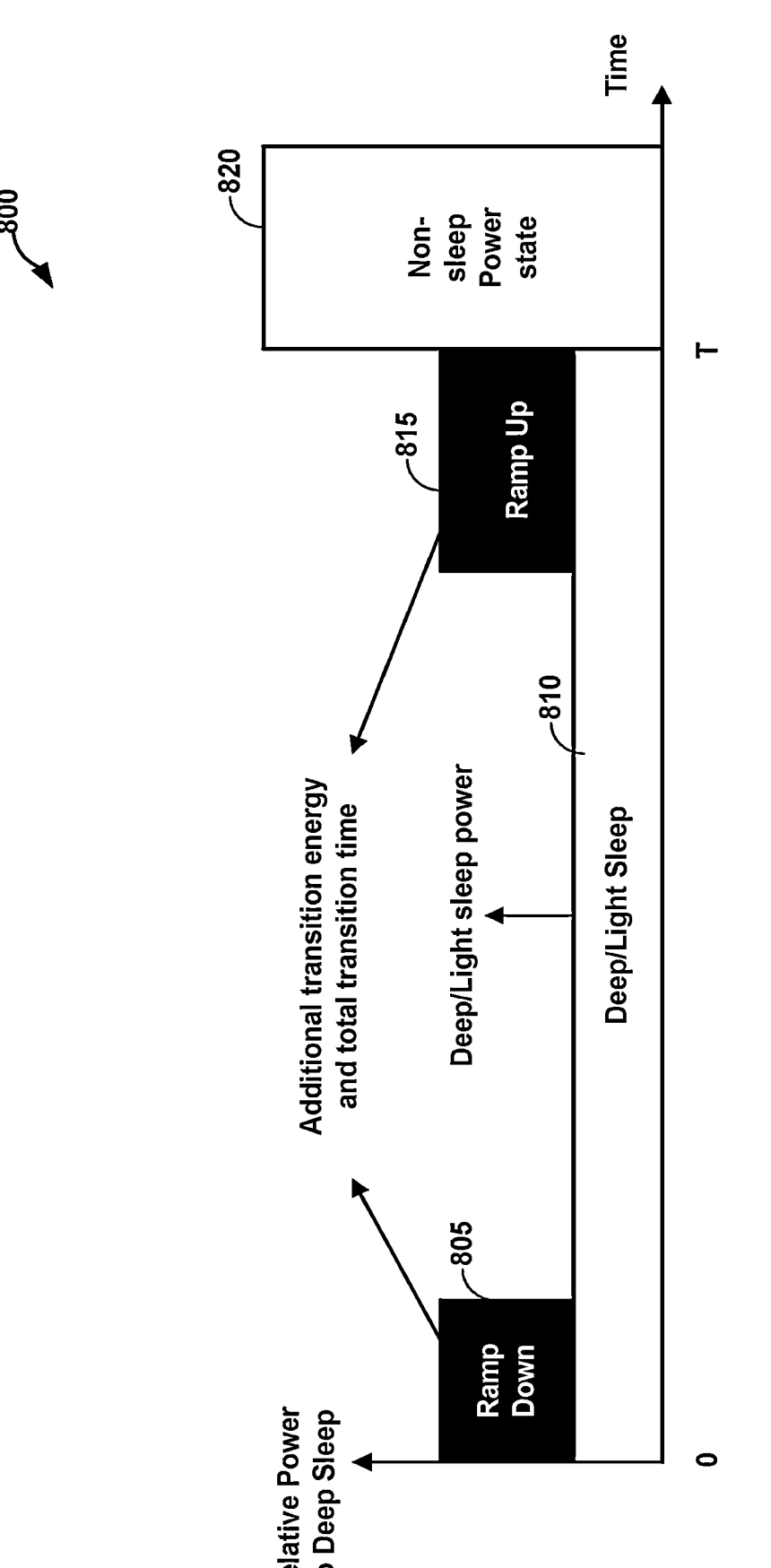
FIG. 8 illustrates an example transition time for a deep/light sleep state.

FIG. 8 illustrates an example transition time for a deep/light sleep state. In the timeline 800 shown in FIG. 8, the X-axis represents the relative power level to deep sleep consumed by a UE 115. The Y-axis represents time. At time 0, the UE 115 begins a ramp down period 805. During the ramp down period, the UE 115 may power off various hardware components (e.g., RF components) of the UE depending on the sleep mode. For example, more hardware components may be powered off for a deep sleep mode as compared to a light sleep mode. After ramp down period 805, the UE 115 may enter into a sleep mode 810 (e.g., a deep sleep mode or a slight sleep mode). After a predetermined amount of time, which may be dependent on the parameters of the sleep mode and/or the duration of a DRX inactive mode (e.g. total time T), the UE 115 may enter a ramp up period 815. During the ramp up period 815, the UE 115 may power on any hardware components that were turned off during the ramp down period 805. Together, the ramp down period 805 and the ramp up period 815 represent the additional transition energy and total transition time needed to enter the particular sleep mode 810 (e.g., see FIG. 7). In general, the deeper the sleep state (e.g., the more power that is saved), the longer the transition time for such a sleep state. In some examples, (e.g., see FIG. 7), the micro sleep state requires little to no transition time. As such, a UE 115 may be configured to enter a micro sleep state as much as possible when the time duration of other sleep states is not available.

In one example of the disclosure, if the duration of a DRX inactive time is 0 to 6 ms, the UE 115 may be configured to enter the micro sleep state only, and is expected to do so. If the duration of the DRX inactive time is from 6 to 20 ms, the UE 115 may be configured to enter either a light sleep state of a micro sleep state. In some examples, the UE 115 may be configured to preferentially enter the light sleep state when the duration of the DRX inactive time is from 6 to 20 ms. If the duration of the DRX inactive time is greater than 20 ms, the UE 115 may be configured to enter any sleep state, but the UE 115 may be configured to preferentially enter the deep sleep state. The above is just one example configuration for a UE based on example sleep parameters. The UE 115 may be configured with other sleep parameters.

In the context of this disclosure, the UE 115 may indicate the sleep parameters by which it is configured to operate in capability information 225 (see FIG. 2). More specifically, the UE 115 may indicate a capability to process reference signal information during a DRX inactive time based on both the duration of the DRX inactive and the sleep parameters of the UE 115. The network entity 105 may send the configuration 210 (see FIG. 2) that specifies how the UE 115 is to process the reference signal information during the DRX inactive time based on both the DRX inactive time and the sleep parameters. As one example, for one or more of the sleep modes, the UE 115 may indicate a capability to transmit only (e.g., transmit an SRS and/or transmit a CSI-RS report), receive only (e.g., receive a CSI-RS with a certain number of ports/antennas), or any combination thereof.

For example, the capability information 225 may include information indicative of a capability to process the reference signal information during the DRX inactive time in accordance with a duration of the DRX inactive time in relation to a duration of a sleep mode of the UE 115. The UE 115 may then receive, from the network entity 105, the configuration 210 based on the information indicative of the capability to process the reference signal information during the DRX inactive time in accordance with the duration of the DRX inactive time in relation to the duration of a sleep mode of the UE 115.

In a more general sense, as will be explained in the examples below, the capability information of the UE 115 to process the reference signal information during the DRX inactive time may be based on one or more of a duration of the DRX inactive time, a time period between the DRX active time and a transmission or a reception of the reference signal, and/or sleep mode parameters for the UE 115 during the DRX inactive time.

In some examples, the time it takes UE 115 to process a CSI-RS report, and subsequently send the CSI-RS report, during the DRX inactive time may be different, and possibly longer, than the time it takes the UE 115 to process a CSI-RS report during a DRX active. For example, the UE 115 may have powered down one more hardware components during a DRX inactive time. Also, there are fewer timing requirements for performing other communication functions during the DRX inactive time. Accordingly, the network entity 105 may include one or more timelines for CSI-RS processing and reporting during the DRX inactive time.

In other examples of the disclosure, rather than specifically using the duration of the DRX inactive time as a basis for processing reference signals during a DRX inactive, the UE 115 may use a duration between a first time from a first indication and a second time at a second indication as the basis for processing reference signals during the DRX inactive time. That is, the duration used to determine whether reference signals are processed during the DRX inactive time is not merely the duration of the DRX inactive time, but may be a variable time that is determined from one or more indications received at, or determined by, the UE 115.

In one example, the first time that marks the beginning of the duration of the DRX inactive time may be specified by a first indication. In a basic example, the first indication may simply be the beginning of the DRX inactive time. In another example, the first indication may be an indication of PDCCH skipping (e.g., received from the network entity 105). An indication of PDCCH skipping instructions the UE 115 that no more data will be send during the DRX active time (e.g., the UE 115 need no longer monitor for PDCCH). As such, the indication of PDCHH skipping effectively shortens the DRX active time and increases the DRX inactive time. In other examples, the first indication of a first time that marks the beginning of the duration of the DRX inactive time may be an indication of end of burst. The indication of an end of burst instructions the UE 115 to move to low power sleep state until the end of DRX active time. In effect, the end of burst indication may lengthen the length of time of the DRX inactive time and/or the time available to enter one or more sleep modes.

The second time, specifying the end of the duration, may be indicated by one or more of the time of the next DRX active time, the time of the WUS monitoring occasion for the next DRX active time, or a specific time specifically indicated in the first indication. For example, the first indication can indicate an expected time to receive no data and/or a specific time available to enter one or more sleep states. The network entity 105 may indicate to UE 115 to not expect data until that second time. Such an indication may cause the UE 115 to skip part or all of a one or more of the next DRX active times/cycles, thus effectively increasing the duration of the DRX inactive time. The second time, specifying the end of the duration, may also be indicated by a reception time of a CSI-RS and/or a transmission time of an SRS and/or reference signal report. Likewise, the first time may be indicated by the reception/transmission of a reference signal and/or reference signal report and the second time.

Accordingly, in one example, the UE 115 may be configured to process the reference signal information during the DRX inactive time in accordance with the configuration and further based on a time duration between a first indication of a first time and a second time. In another example, the UE 115 may be configured to process the reference signal information during the DRX inactive time in accordance with the configuration and further based on a time duration between the first indication and a time of reception/transmission of a reference signal. In another example, the UE 115 may be configured to process the reference signal information during the DRX inactive time in accordance with the configuration and further based on a time duration between reception/transmission of a reference signal and the second time.

Figure 9:
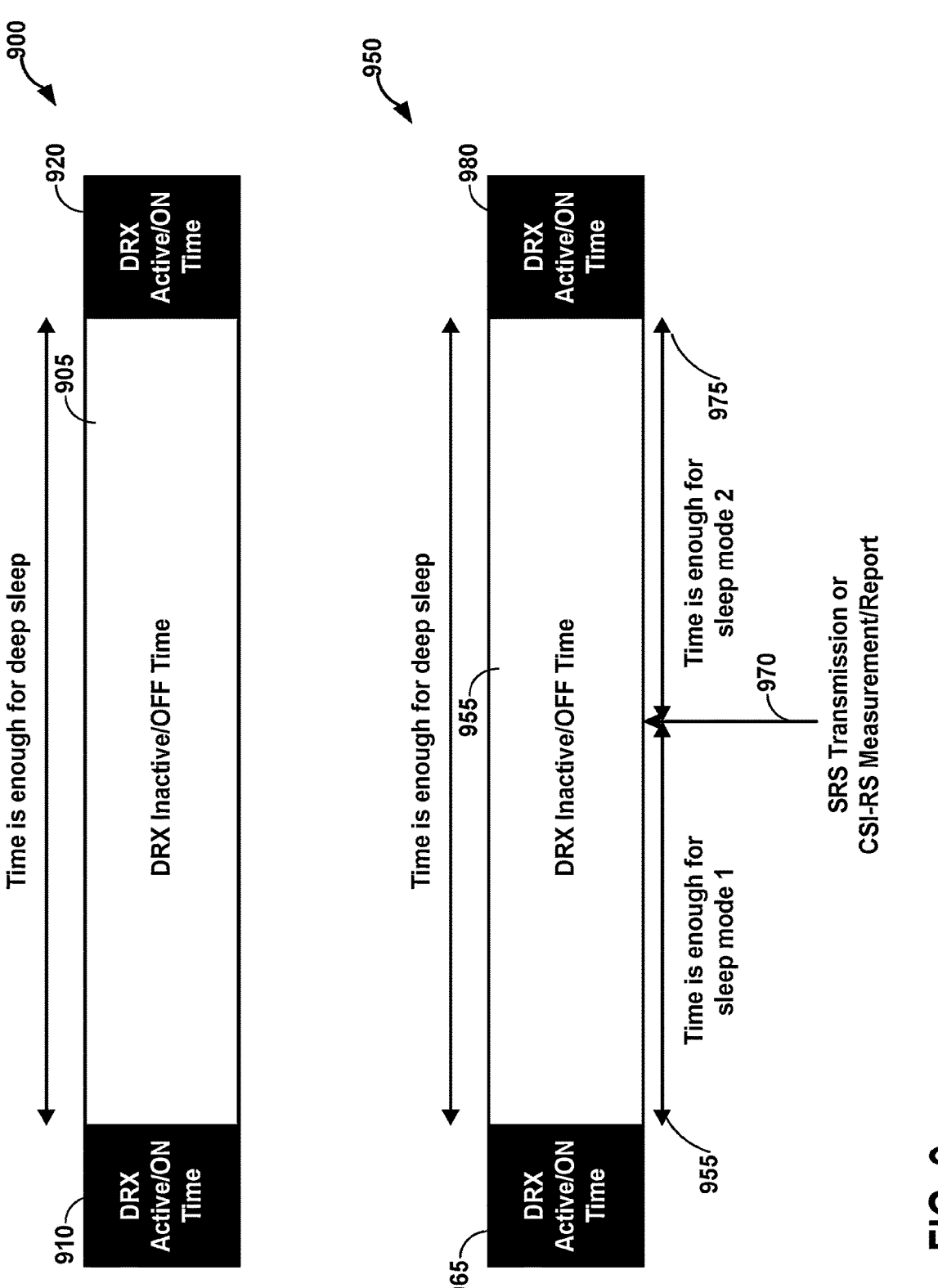
FIG. 9 illustrates an example timeline for reference signal processing during a DRX inactive time based on time durations.

FIG. 9 illustrates an example timeline for reference signal processing during a DRX inactive time based on time durations. In timeline 900, the DRX inactive/off time 905 between DRX active/on time 910 and DRX active/on time

920 is of a duration long enough to enter a deep sleep mode. The UE 115 may process reference signals during DRX inactive/off time 905 in accordance with the configuration received from the network entity 105. In some examples, the configuration may specify that the UE 115 is to not enter the deep sleep, but instead process reference signal information during the DRX inactive/off time 905. The UE 115 may instead enter other types of sleep after processing the reference signal information during the DRX inactive/off time 905. In other examples, if the UE 115 may enter a particular sleep state (e.g., deep sleep) after waking up during DRX inactive/off time 905, then it the UE 115 is configured to process the reference signal information during the DRX inactive/off time 905. In other examples, if the UE 115 may not enter a particular sleep state (e.g., deep sleep) after waking up during DRX inactive/off time 905, then it the UE 115 is configured to not process the reference signal information during the DRX inactive/off time 905.

Timeline 950 shows another scenario where a DRX inactive/off time 955 is split into two time durations. A first time duration 960 is between the end of DRX active/on time 965 (e.g., the first time) and a time 970 of SRS transmission or CSI-RS reception, measurement, and/or report (e.g., second time). A second time duration 975 is between the time 970 (e.g., the first time for this duration) and the start of DRX active/on time 980 (e.g., the second time for this duration).

In this example, if time between DRX active/on time 965 and time 970 (e.g., the time of SRS transmission or CSI-RS reception measurement, and/or report) is less than the time needed for a particular certain sleep mode, the UE 115 can avoid entering the sleep state until the UE 115 completes processing the reference signal information. In some examples, for CSI-RS reception, the UE 115 may be configured to wait to transmit or process a CSI-RS report until a certain defined time or until DRX active/on time 980.

If the UE 115 will not enter a particular sleep state until time 970, and will have to cancel a particular sleep state (e.g., a deep sleep state or light sleep state) because of SRS transmission and/or CSI-RS reception, then the UE 115 may be configured to not perform reference signal processing during the DRX inactive/off time 955.

In a general examples, as long as the UE the may stay a particular pre-defined sleep state (e.g., deep sleep or light sleep) while still transmitting an SRS during the DRX inactive/off time 955, then the UE 115 may be configured to transmit the SRS. In any of the examples above, the behavior of the UE 115 when processing reference signals during a DRX inactive time is specified by a configuration supplied to the UE 115 by the network entity 105, wherein the configuration is based on capability information received from the UE 115.

Figure 10:
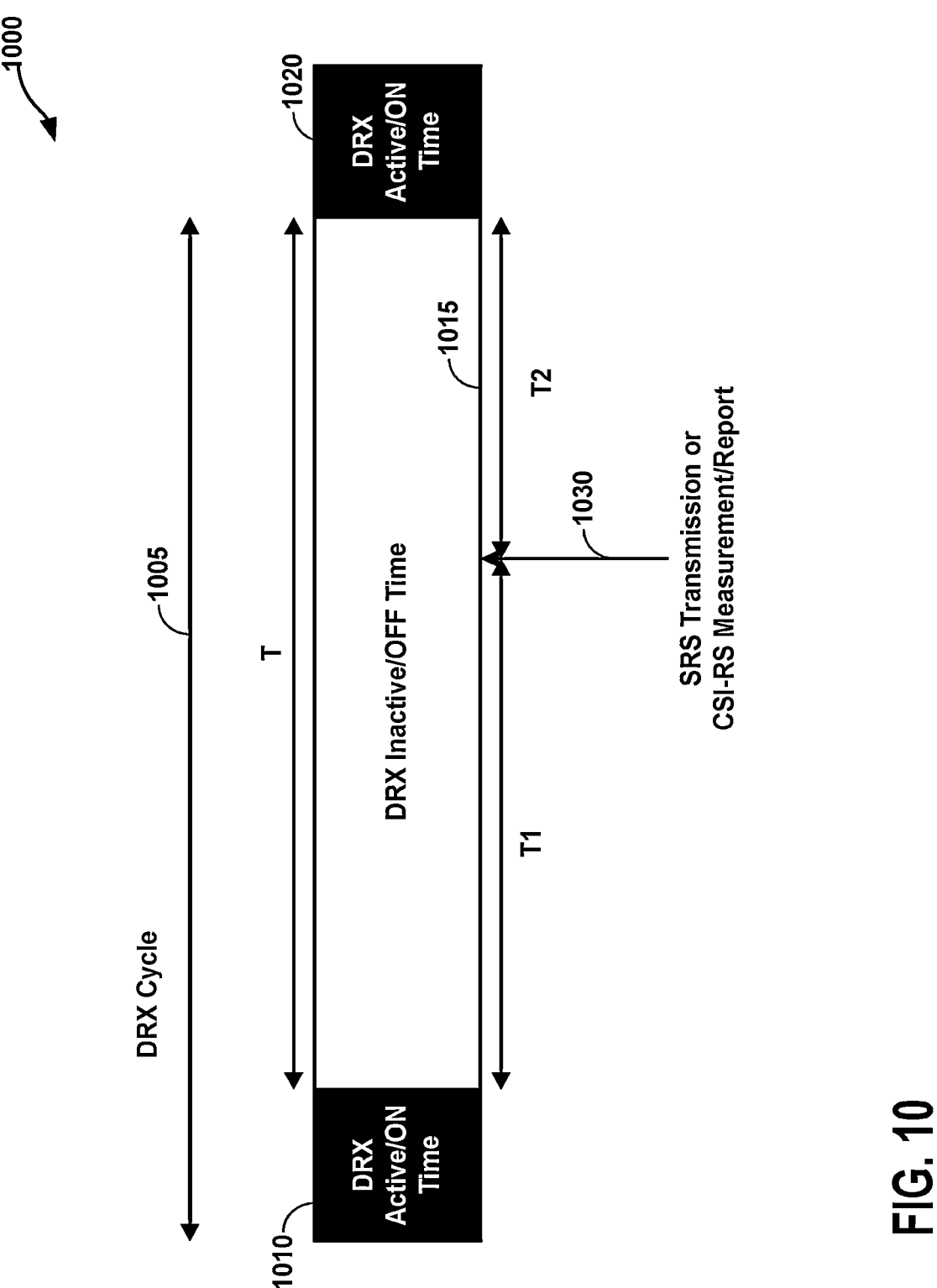
FIG. 10 illustrates an example timeline for reference signal processing during a DRX inactive time based on time durations.

FIG. 10 illustrates an example timeline 1000 for reference signal processing during a DRX inactive/off time 1015 based on time durations T, T1, and T2. Timeline 1000 shows one DRX cycle 1005 that includes DRX active/on time 1010 and DRX inactive/off time 1015. The next DRX active time after DRX cycle 1005 is DRX active/on time 1020. In timeline 1000, an SRS transmission and/or CRS-RS reception, measurement, and report is at time 1030.

Based on T1 and T2 and the received configuration, the UE 115 may be configured to perform reference signal processing (e.g., SRS/CSI-RS reception/CSI report) or not. That is, in the example of FIG. 10, the UE 115 may be configured to determine to perform reference signal processing based on various time durations (e.g., T1 and T2) without also directly considering other information (e.g., sleep parameters, power information, channel information, etc.). Again, the determination of reference signaling processing may be configured by the network entity 105 through L1/L2/L3 signaling and may be dynamically changed. In FIG. 10, the time duration T is the DRX inactive/off time 1015 may be based on DRX configured active time or PDCCH skipping to a DRX ON/active time interval. Time durations T1 and T2 are configured by network entity 105 and the decision to process CSI-RS/SRS and/or process a CSI-RS report is also configured. Time durations T1 and T2 could be from last active time (e.g., DRX active/on time 1010) to a first time to monitor WUS or to a next DRX active/on time 1020. The next DRX active/on time 1020 may be a configured DRX active on time in some examples, but may also be reduced based on PDCCH skipping or extended by a DRX inactivity timer, as will be discussed below. The time duration T may be computed based on last activity. In this context, last activity may refer to the last time the UE 115 is expected to be ON (e.g., DRX active/on time 1010). For example, if no PDCCH skipping indication or end of burst indication for downlink is receive, the UE 115 may be configured to determine the DRX active/on time ends after the expiration of a DRX inactivity timer from the latest received PDCCH scheduling grant. If the network entity 105 sends PDCCH skipping to skip the remaining period of the DRX active/on time, then the last activity was to receive that PDCCH.

Figure 11:
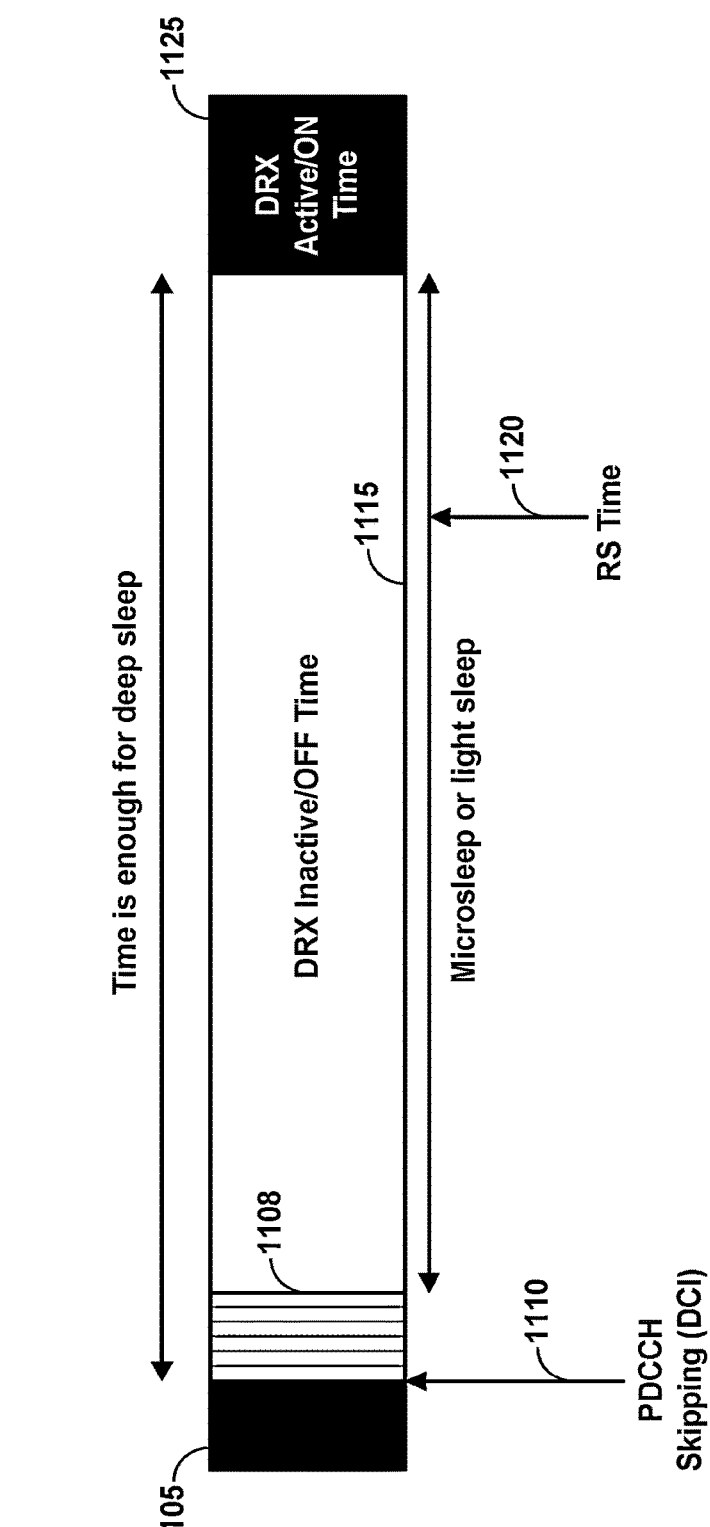
FIG. 11 illustrates an example timeline for reference signal processing during a DRX inactive time based on PDCCH skipping.

FIG. 11 illustrates an example timeline 1100 for reference signal processing during a DRX inactive time based on PDCCH skipping. As shown in FIG. 11, timeline 1100 shows a DRX active/on time 1105 during which an indication of PDCCH skipping is received from the network entity 105 (e.g., via DCI). The indication of PDCCH skipping indicates that the network entity 105 has no more data transmissions for the UE 115 during the DRX active/on time 1105. The UE 115 may then stop monitoring for PDCCH. As such, the DRX inactive/off time 1115 is effectively extended by time duration 1108 from the point the PDCCH skipping indication 1110 is received. Time 120 is the time at which a reference signal is received (e.g., RS time), and DRX active/on time 1125 is the next DRX active time.

In one example, the UE 115 (e.g., via the DRX configuration) is not configured to enter a deep sleep mode (or any other sleep mode where a UE cannot process a reference signal) during DRX inactive/off time 1115. However, based on the PDCCH skipping indication 1110, the effective duration of the DRX inactive/off time 1115 is extended, thus allowing for both the entrance into a sleep mode (e.g., deep sleep) as well as the processing of reference signals at time 1120. Accordingly, in another example of the disclosure, the UE 115 is configured to receive an indication to skip PDCCH reception during the DRX active/on time 1105, and process reference signal information during the DRX inactive/off time 1115 in accordance with an extended duration of the DRX inactive time. The extended duration of the DRX inactive time is based on the indication to skip PDCCH reception (e.g., the time of PDCCH skipping indication 1110) to another second time (e.g., time 1120).

Figure 12:
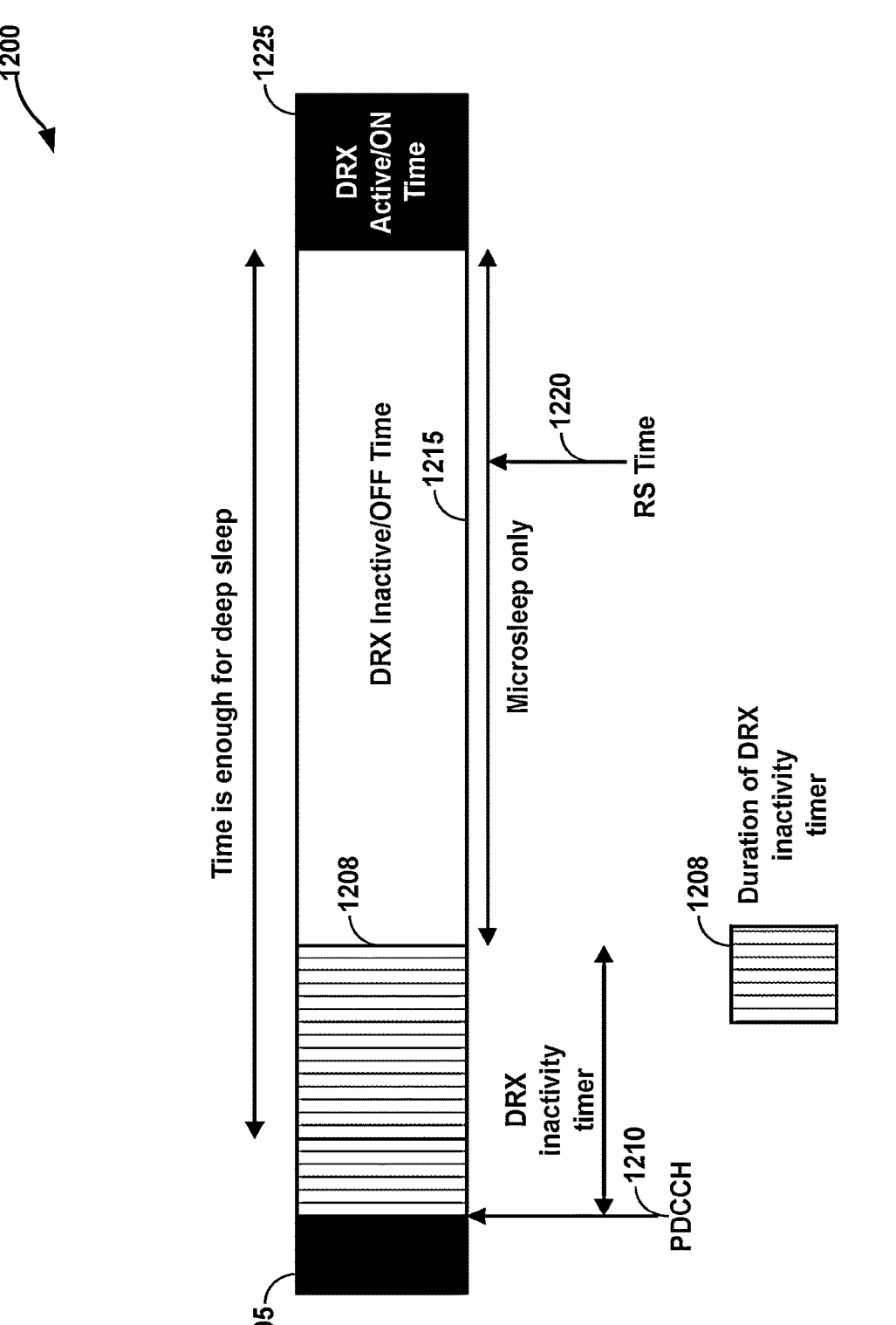
FIG. 12 illustrates an example timeline for reference signal processing during a DRX inactive time based on a DRX inactivity timer.

FIG. 12 illustrates an example timeline 1200 for reference signal processing during a DRX inactive/off time 1215 based on a DRX inactivity timer. In FIG. 12, the duration of DRX inactive/off time 1215 is effectively reduced by the duration 1208 of a DRX inactivity timer. I timeline 1200, the UE 115 received a PDCCH 1210 containing data for the UE 115 during DRX active/on time 1205. In response to receiving PDCCH 1210 the UE 115 may start a DRX inactivity timer and will continue to monitor for PDCCH until the duration 1208 of DRX inactivity time expires. In the example of FIG. 12, the DRX inactivity timer does not expire until after the DRX inactive/off time 1215 was configured to start. The configured DRX inactive/off time 1215 was long enough for the UE 115 to enter a deep sleep mode. However, due to the DRX inactivity timer reducing the effect length of the DRX inactive time, only microsleep may be available. As such, the UE 115 may be configured to transmit/receive reference signals at time 1220 (e.g., RS time) based on the reduced DRX inactive/off time.

In the above example, the UE 115 may be configured to start an inactivity timer during the DRX active time, a remaining duration of the DRX inactive time (e.g., a reduced duration) based on expiration of the activity timer, and process the reference signal information during the DRX inactive time in accordance with the remaining duration of the DRX inactive time.

CSI-RS reporting can be subject to any of the techniques described above with reference to reference signal information processing. In some examples, if CSI report time is close to the start of a DRX active time (e.g., less than a threshold duration away), the UE 115 may be configured to send the CSI report at the first available uplink resources. Such resources may be directly indicated by the network entity 105 or may be specified in a configuration previously sent to the UE 115. In other examples, the UE 115 may be configured to wait to send a CSI report until a network entity 105 sends a request with a configured or dynamic grant of resources over which to transmit the CSI report. In this example, the request is specifically for a CSI report, and is different from aperiodic or triggered CSI-RS reports, which triggers resources for UE 115 to measure the CSI-RS and for UE 115 to send the CSI-RS report. In this example, the UE 115 may have previously buffered CSI-RS sample and may send the report based on a request from the network entity 105.

The time that the UE 115 takes to process a CSI-RS report may be affected by considerations other than sleep mode parameters, the duration of the DRX inactive time, and/or the various time durations described above. As one example, the number of ports (e.g., antennas) over which an SRS is transmitted and/or over which a CSI-RS is received may affect whether or not the UE 115 may perform reference signal processing during the DRX inactive time. For example, if the number of ports over which multiple CSI-RSs are received is larger than a threshold, the UE 115 may be unable to perform reference signal processing (e.g., CSI-RS report processing) during the DRX inactive time for one or more of the sleep modes described above. If the number of ports over which CSI-RSs are received is larger than a threshold, the UE 115 may cancel (e.g., not perform) reference signal processing during the DRX inactive time. If the number of ports over which CSI-RSs are received is less than or equal to a threshold, the UE 115 may perform reference signal processing during the DRX inactive time. In some examples, when the UE 115 does not perform reference signal processing during the DRX inactive time based on the number of ports being too large, the UE 115 may buffer CSI-RS samples and process the CSI-RS report during the next DRX active time.

In general, in addition to any sleep mode parameters and or time duration considerations, the UE 115 may further base the processing of reference signals during the DRX inactive time on the number of ports over which a reference signal and/or reference signal report is transmitted and/or received. For example, when configured to process the reference signal information (e.g. reference signal and/or reference signal report) during the DRX inactive time in accordance with the configuration, the UE 115 is configured to process the reference signal information during the DRX inactive time in accordance with the configuration and further based on a quantity of one or more ports on which the reference signal is received or sent. The threshold number of ports that determines whether or not to process the reference signal information may be indicated in the configuration received from the network entity 105. The thresholds may vary based on duration of DRX inactive time and/or sleep mode parameters.

In a further example, the UE 115 may be configured the process reference signal information during the DRX inactive time based on power information related to the UE 115 (e.g., a power level). This power information may be applicable in situations where the UE 115 is an EH device. The power information consideration may be in addition to sleep mode and/or time duration considerations. The power level information may also be used in conjunction with the ports threshold techniques described above or alone. In a general example, when configured to process the reference signal information during the DRX inactive time in accordance with the configuration, the UE 115 is configured to process the reference signal information during the DRX inactive time in accordance with the configuration and further based on power information of the UE 115.

The power information may include one or more of a charging rate or charging rate profile of the UE 115, a discharging rate (e.g., power consumption) profile or discharging rate profile of the UE 115, an energy state/level profile (e.g., amount of energy at energy storage) of the UE 115, or an energy state of the UE 115. A charging rate profile may be indicative of the charging rate of the UE 115 over time. A discharging rate profile may be indicative of a discharging rate (e.g., power consumption due to at least one of signals processing for transmission or reception, energy storage leakage an imperfection and energy required for clock operation among other reasons) of the UE 115 over time. An energy state/level profile may be indicative of an energy state/level of the UE 115 over time. In some examples, an energy state may be an energy level. In some examples, the charging/discharging/energy state profiles may include current measurements of the charging rate, discharging rate, and/or energy state/level of the UE 115 and one or more future values on one or more future time durations based on prediction techniques. The prediction techniques may include machine learning (ML) prediction techniques and/or non-ML prediction techniques. In general, the UE 115 may process reference signal during the DRX inactive time based on the power information meeting some predetermined thresholds, where the thresholds may be communicated to the network entity 105 in capability information, and/or communicated to the UE 115 in the configuration. The UE 115 may be configured to not process reference signals (e.g., cancel processing) during the DRX inactive time based on the power information not meeting some predetermined thresholds.

In a further example, the UE 115 may be configured the process reference signal information during the DRX inactive time based on channel metrics and characteristics (more generally, channel information). In one example, the channel information may include a measured SINR of the channel and/or a predicted SINR of the channel. In other examples, the channel information may include interference characteristics, such as mean, power, variance, and/or a covariance matrix.

In other examples, the channel information may include information related to Doppler shift, Doppler spread and/or delay spread. For example, a high Doppler spread or shift may be indicative a channel that is changing quickly. As such, it may be more important to perform reference signal processing more frequently to track the changes in such a channel.

In other examples, the channel information may include channel phase, channel frequency, channel time errors, and predictors for each. In still other examples, the channel information may include channel type or model. Example channel modes may include a tapped delay line (TDL) channel model, a clustered delay line (CDL) channel model, or an additive white Gaussian noise (AWGN) channel model. The channels may be line of sight (LOS) channels or non line of sight (NLOS) models.

One or more of the channel information described above may be the basis on which the UE 115 may be configured to process reference signals during the DRX inactive time. For example, it may be desirable to generate and send a CSI-RS report more quickly and/or more frequently, hence cancellation of reference signal processing during the DRX inactive time may be less desirable, even if time for such processing does allow for the UE 115 to enter a sleep mode. In this example, of the disclosure, when configured to process the reference signal information during the DRX inactive time in accordance with the configuration, the UE 115 may be further configured to process the reference signal information during the DRX inactive time in accordance with the configuration and further based on channel information of a channel used by the first network entity and the second network entity to communicate.

In another example of the disclosure, the UE 115 may be configured to determine to process reference signal information during the DRX inactive time in accordance with configuration and a plurality of considerations, including any combination of a duration of the DRX inactive time, a time period between the DRX active time and a transmission or a reception of the reference signal (e.g., T1 and T2 in FIG. 10), channel information, power information, and/or sleep parameters. In one example, the configuration may be a multi-dimensional table including a plurality of input values, and an output for each combination of input values. In this context, the output is the behavior of UE 115 for processing the reference signal information during the DRX in active time.

In one example, the multi-dimensional table may include time durations T1 and T2 (see FIG. 2), one or more examples of the channel information (channel info) described above, and one or more examples of the power information (power info) described above. One example structure of the multi-dimensional table in the configuration is shown below:

Multi-Dimensional Configuration Table
1. if channel info=X1, power info=Y1,
   a. if T1=n1 and T2=m1, do beh1
   b. if T1=n2 and T2=m2, do beh2
   c. if T1=n2 and T2=m1, do beh3
   d. etc.
2. if channel info=X2, power info=Y1,
   a. if T1=n1 and T2=m1, do beh4
   b. if T1=n2 and T2=m2, do beh5
   c. if T1=n2 and T2=m1, do beh6
   d. etc.

3. if channel info=X1, power info=Y1,
   a. if T1=n1 and T2=m1, do beh7
   b. if T1=n2 and T2=m2, do beh8
   c. if T1=n2 and T2=m1, do beh9
   d. etc.
4. etc.

In the example Table above, X1 and X2 are example values of channel information, Y1 and Y2 are example values of power information, n1 and n2 are example time durations for T1, m1 and m2 are example time durations for T2, and beh1-beh9 are example behaviors to be performed by the UE 115 (e.g., processing of reference signal information during the DRX inactive time). The above is just a general example. More values of power information, channel information and time durations T1 and T2 may be used. Also, each of power information and channel information may be multi-dimensional inputs themselves. That is, more than one power information metric or channel information metric may be used as an input to the multi-dimensional configuration table. In some examples, the UE 115 may be configured to update the multi-dimensional configuration table based on at least one RRC state (e.g., connected, idle, inactive). That is, the output behaviors (beh1-behN) of the table may change based on the current RRC state. In other examples, the output behaviors of the table are independent of RRC state.

In accordance with the examples described above, the UE 115 may receive the multi-dimensional configuration table from the network entity 105 using L1/L2/L3 signaling, as described above with reference to the configuration. The UE 115 may be configurated to determine the power information and/or the channel information using any of the techniques described above, including techniques for estimating, measuring, and/or predicting the channel information and the power information. In one example, the UE 115 does not report the latest channel information to the network entity 105. In other examples, the UE 115 may be configured to report the latest channel information and/or the power information to the network entity 105 so that the network entity 105 may be able to determine the behavior of the UE 115 given the multi-dimensional configuration table and the T1/T2 durations. In other examples, rather than reporting the latest channel information and/or power information, the UE 115 may be configured to use the last reported channel information and/or power information as inputs to the multi-dimensional configuration table. As this channel/power information was already reported, the network entity 105 may be able to determine the behavior of the UE 115.

The UE 115 may also be configured to determine the current values of time durations T1 and T2. The UE 115 may determine the time durations T1 and T2 based on or more of PDCCH skipping, length of DRX inactive time, a time period between the DRX active time and a transmission or a reception of the reference signal. As described above, the UE 115 may used the values of T1 and T2 as inputs to the multi-dimensional configuration table to determine behaviors for processing reference signal information during the DRX inactive time. To avoid any behavior mismatch at the network entity 105, particularly in cases where the network entity 105 does not have channel information and/or power information from the UE 115 (as described above), then the UE 115 can indicate its behavior to the network entity 105 before going to sleep using L1/L2/L3 indications or indications multiplexed with other L1/L2/L3 indications. Other L1/L2/L3 indications may include a hybrid automatic repeat request acknowledgment (HARQ-ACK), a CSI report, an SRS, a buffing status report (BSR), and/or a power headroom report (PHR). In on example, the UE 115 may multiplex an indication of a behavior for processing reference signal during the DRX inactive time with the latest HARQ-ACK (e.g., during a PDSCH HARQ-ACK during PDCCH skipping).

As described above, the UE 115 may report power information and/or channel information to the network entity 105. In one example, the UE 115 may be configured to report the power/channel information using dedicated and/or configured resources and/or times in an uplink (UL) channel, sidelink (SL) channel, or other link channel. The resources and/or times may be configured in L1/L2/L3 signaling. The UE 115 may report the power/channel information via the L1/L2/L3 signaling or multiplex the power information report with other L1/L2/L3 signaling, such as described above with reference to the T1/T2 durations. In some examples, the power/channel information reports may be on the same resources. In other examples, the power information report and the channel information report are on different resources.

The network entity 105 may send the configuration to the UE 115, periodically or after each report described above (e.g., power information, channel information T1, T2). The network entity 105 may also send the configuration to the UE 115 in response to a request to send the configuration. As described above, the configuration may be in the form of a multi-dimensional configuration table. For example, the network entity 105 may send the multi-dimensional configuration table in response to each set of T1 and T2 received from the UE 115. Similarly, the network entity 105 may send the multi-dimensional configuration table in response to channel information and/or power information reported by the UE 115. This example may be beneficial in multiple DRX cycles until a new report is from the UE 115 related to power information and/or channel information.

In another example, a first network node (e.g., a gNB) may send determined behavior information to another network node (e.g., an energy harvesting (EH) UE) based on previous knowledge of reports (e.g., channel/power reports) and T1 and T2 information. In this example, the first network node has already determined the T1 and T2 values. This technique may include the network node indicating each DRX cycle decision (e.g., the behavior for processing reference signal information during the DRX inactive time) to the UE. In this example, the first network node and or EH UE may report time durations T1/T2, channel information, and power information using any of the techniques described above.

The various techniques described above for reporting or not reporting channel/power information may be configured as two different modes supported by the network entity 105 and configured using L1/L2/L3 configuration signaling. In other examples, the two modes for reporting or not reporting the channel/power information can be determined by the UE 115 and can be based on the sidelink capability of a UE, EH device, a base station, a gNB, or any other network node. The techniques of this disclosure are applicable with any type of interface between two network entities, including Uu link/interface, SL (e.g., PC5 interface), a new link/interface between UEs/entities, or links between any transmitter or a receiver. In some examples, the new link can be a new communication interface or link between a gNB (e.g., a network (NW) node 1, and an EH device (e.g., a NW node 2).

Figure 13:
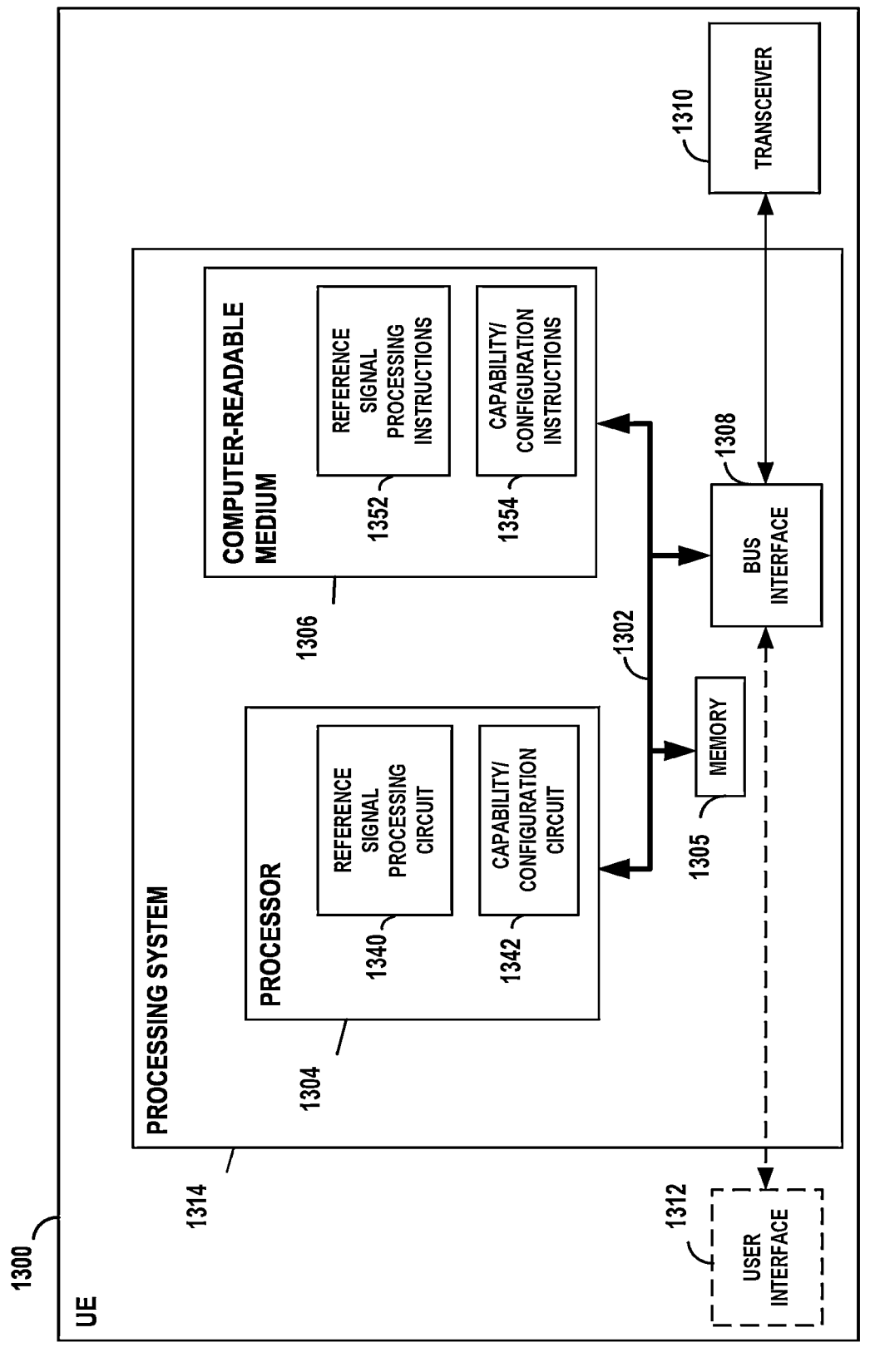
FIG. 13 is a block diagram illustrating an example of a hardware implementation for a network entity according to some aspects of this disclosure.

FIG. 13 is a block diagram illustrating an example of a hardware implementation for a UE 1300 employing a processing system 1314. For example, the UE 1300 may be a UE 115 as illustrated in any one or more of FIGS. 1 and 2.

The UE 1300 may include a processing system 1314 having one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1300 may be configured to perform any one or more of the functions described herein. For example, the processor 1304, as utilized in a UE 1300, may be configured (e.g., in coordination with the memory 1305) to implement any one or more of the processes and procedures described above and illustrated below in FIG. 15.

The processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310. The transceiver 1310 provides a communication interface or means for communicating with various other apparatus over a transmission medium. Depending upon the nature of the apparatus, a user interface 1312 (e.g., keypad, display, speaker, microphone, joystick) may also be provided. Of course, such a user interface 1312 is optional, and some examples, such as a base station, may omit it.

In some aspects of the disclosure, the processor 1304 may include a reference signal processing circuit 1340 and a capability/configuration circuit 1342 configured (e.g., in coordination with the memory 1305) for various functions, including, e.g., processing reference signals during a DRX inactive time in accordance with the techniques of the disclosure described herein. In general, the UE 1300 may be configured to operate according to a connected DRX mode based on a WUS, wherein the connected DRX mode includes a DRX active time and a DRX inactive time. The capability/configuration circuit 1342 may be configured to send, to a network entity, capability information of the UE 1300 to process, during the DRX inactive time, reference signal information, wherein the reference signal information includes one or more of: a reference signal or a reference signal report. The capability/configuration circuit 1342 may be also configured to receive, from the second network entity, a configuration based on the capability information, wherein the configuration specifies how the UE 1300 is to process the reference signal information during the DRX inactive time. The reference signal processing circuit 1340 may be configured to process the reference signal information during the DRX inactive time in accordance with the configuration.

The processor 1304 is responsible for managing the bus 1302 and general processing, including the execution of software stored on the computer-readable medium 1306. The software, when executed by the processor 1304, causes the processing system 1314 to perform the various functions described above for any particular apparatus. The processor 1304 may also use the computer-readable medium 1306 and the memory 1305 for storing data that the processor 1304 manipulates when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306. The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1306 may store computer-executable code that includes reference signal processing instructions 1352 and capability/configuration instructions 1354 configured for various functions, including, e.g., processing reference signals during a DRX inactive time in accordance with the techniques of the disclosure described herein. The capability/configuration instructions 1354 may be configured to send, to a network entity, capability information of the UE 1300 to process, during the DRX inactive time, reference signal information, wherein the reference signal information includes one or more of: a reference signal or a reference signal report. The capability/configuration instructions 1354 may be also configured to receive, from the second network entity, a configuration based on the capability information, wherein the configuration specifies how the UE 1300 is to process the reference signal information during the DRX inactive time. The reference signal processing instructions 1352 may be configured to process the reference signal information during the DRX inactive time in accordance with the configuration.

In one configuration, an apparatus for wireless communication includes means for operating according to a connected DRX mode based on a WUS, wherein the connected DRX mode includes a DRX active time and a DRX inactive time, means for sending, to a second network entity, capability information of the first network entity to process, during the DRX inactive time, reference signal information, wherein the reference signal information includes one or more of: a reference signal or a reference signal report, means for receiving, from the second network entity, configuration based on the capability information, wherein the configuration specifies how the first network entity is to process the reference signal information during the DRX inactive time, means for processing the reference signal information during the DRX inactive time in accordance with the configuration. In one aspect, the aforementioned means may be the processor 1304, including reference signal processing circuit 1340 and capability/configuration circuit 1342, configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1 and 2, and utilizing, for example, the processes and/or algorithms described above and described below in relation to FIGS. 15 and/or 16.

Figure 14:
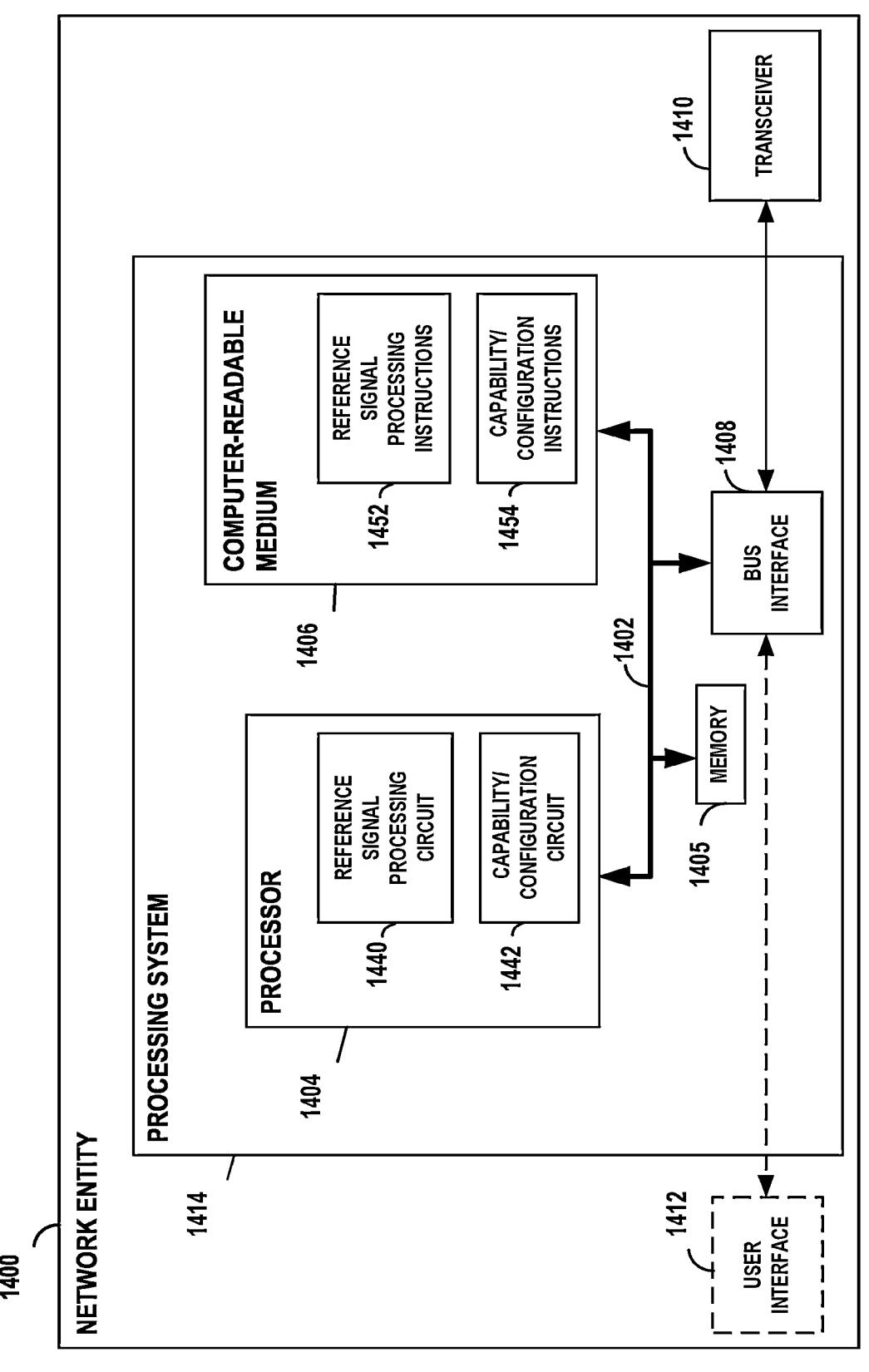
FIG. 14 is a block diagram illustrating an example of a hardware implementation for a UE according to some aspects of this disclosure.

FIG. 14 is a conceptual diagram illustrating an example of a hardware implementation for an exemplary network entity 1400 (e.g., a gNB or base station) employing a processing system 1414. In accordance with various aspects of the disclosure, a processing system 1414 may include an element, or any portion of an element, or any combination of elements having one or more processors 1404. For example, the network entity 1400 may be network entity 105 as illustrated in any one or more of FIGS. 1 and 2.

The processing system 1414 may be substantially the same as the processing system 1414 illustrated in FIG. 13, including a bus interface 1408, a bus 1402, memory 1405, a processor 1404, and a computer-readable medium 1406. Furthermore, the network entity 1400 may include a user interface 1412 and a transceiver 1410 substantially similar to those described above in FIG. 13. That is, the processor 1404, as utilized in the network entity 1400, may be configured (e.g., in coordination with the memory 1405) to implement any one or more of the processes described above and illustrated in FIG. 16.

In some aspects of the disclosure, the processor 1404 may include a reference signal processing circuit 1440 and a capability/configuration circuit 1442 configured (e.g., in coordination with the memory 1405) for various functions, including, e.g., processing reference signals during a DRX inactive time in accordance with the techniques of the disclosure described herein. In general, the network entity 1400 may be configured to instruct a UE to operate according to a connected DRX mode based on a WUS, wherein the connected DRX mode includes a DRX active time and a DRX inactive time. The capability/configuration circuit 1442 may be configured to receive, from the UE, capability information of the UE to process, during the DRX inactive time, reference signal information, wherein the reference signal information includes one or more of: a reference signal or a reference signal report. The capability/configuration circuit 1442 may be also configured to send, to the UE, a configuration based on the capability information, wherein the configuration specifies how the network entity is to process the reference signal information during the DRX inactive time. The reference signal processing circuit

1440 may be configured to process the reference signal information received from the UE during the DRX inactive time.

In one or more examples, the computer-readable storage medium 1406 may store computer-executable code that includes reference signal processing instructions 1452 and capability/configuration instructions 1454 configured for various functions, including, e.g., processing reference signals during a DRX inactive time in accordance with the techniques of the disclosure described herein. The capability/configuration instructions 1454 may be configured to receive, from the UE, capability information of the UE to process, during the DRX inactive time, reference signal information, wherein the reference signal information includes one or more of: a reference signal or a reference signal report. The capability/configuration instructions 1454 may be also configured to send, to the UE, a configuration based on the capability information, wherein the configuration specifies how the network entity is to process the reference signal information during the DRX inactive time. The reference signal processing instructions 1452 may be configured to process the reference signal information received from the UE during the DRX inactive time.

In one configuration, an apparatus for wireless communication includes means for instructing a UE to operate according to a connected DRX mode based on a WUS, wherein the connected DRX mode includes a DRX active time and a DRX inactive time, means for receiving, from the UE, capability information of the UE to process, during the DRX inactive time, reference signal information, wherein the reference signal information includes one or more of: a reference signal or a reference signal report, and means for sending, to the UE, a configuration based on the capability information, wherein the configuration specifies how the UE is to process the reference signal information during the DRX inactive time. In one aspect, the aforementioned means may be the processor 1404, including reference signal processing circuit 1440 and capability/configuration circuit 1442, configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1 and 2, and utilizing, for example, the processes and/or algorithms described above and below in relation to FIGS. 15 and 16.

FIG. 15 is a flow chart illustrating an exemplary process 1500 for processing reference signals during a DRX inactive time in accordance with some aspects of the present disclosure. As described below, a particular implementation may omit some or all illustrated features, and may not require some illustrated features to implement all embodiments. In some examples, the UE 1300 illustrated in FIG. 13 may be configured to carry out the process 1500. In some examples, any suitable apparatus or means for carrying out the functions or algorithm described below may carry out the process 1500.

At block 1502, a UE (e.g., UE 115 and/or UE 1300) may be configured to operate according to a connected DRX mode based on a WUS. The connected DRX mode includes a DRX active time and a DRX inactive time. In some examples, the UE 115 may be configured to receive the WUS from a network entity 105, and start a duration timer for the DRX active time based on receipt of the WUS.

At block 1504, the UE may be configured to send, to the network entity, capability information of the UE to process, during the DRX inactive time, reference signal information. The reference signal information may include one or more of a reference signal or a reference signal report. In some examples, the capability information may include any combination of the following capabilities.

1) information indicative of a first capability of the UE to send an SRS during the DRX inactive time, wherein the SRS is the reference signal, 2) information indicative of a second capability of the UE to receive a CSI-RS during the DRX inactive time, wherein the CSI-RS is the reference signal, 3) information indicative of a third capability of the UE to generate a CSI-RS report during the DRX inactive time, wherein the CSI-RS report is the reference signal report, 4) information indicative of a fourth capability of the UE to send the CSI-RS report during the DRX inactive time wherein the CSI-RS report is the reference signal report, 5) information indicative of a firth capability of the UE to buffer the CSI-RS during the DRX inactive time and send the CSI-RS report during the DRX active time, wherein the CSI-RS is the reference signal and the CSI-RS report is the reference signal report, 6) information indicative of a sixth capability of the UE to buffer CSI-RS samples during the DRX inactive time and send the CSI-RS report at a specified time, wherein the CSI-RS report is the reference signal report, or 7) information indicative of a seventh capability of the UE to buffer CSI-RS samples during the DRX inactive time and send the CSI-RS report based on a request from the network entity, wherein the CSI-RS report is the reference signal report.

In other examples, the capability information of the IE to process the reference signal information during the DRX inactive time is based on one or more of: a duration of the DRX inactive time, a time period between the DRX active time and a transmission or a reception of the reference signal, or sleep mode parameters for the first network entity during the DRX inactive time.

The UE may be configured to send, to the network entity, the capability information of the UE to process, during the DRX inactive time, reference signal information, in or more of the following: during initial access with the second network entity, based on a capability inquiry, in user assistance information in RRC signaling, or in one or more of layer 1 signaling, layer 2 signaling, or layer 3 signaling.

At block 1504, the UE may receive, from the network entity, a configuration based on the capability information, wherein the configuration specifies how the UE is to process the reference signal information during the DRX inactive time.

In one example, the capability information includes information indicative of a capability to process the reference signal information during the DRX inactive time in accordance with a duration of the DRX inactive time in relation to a duration of a sleep mode of the UE. In this example, the UE may be configured to receive the configuration based on the information indicative of the capability to process the reference signal information during the DRX inactive time in accordance with the duration of the DRX inactive time in relation to the duration of a sleep mode of the UE.

At block 1506, the UE may be configured to process the reference signal information during the DRX inactive time in accordance with the configuration.

In one example, the UE may process the reference signal information during the DRX inactive time in accordance with the configuration and based on a duration between first indication of a first time and a second time. In one example, the first indication of the first time is one or more of: an indication to skip PDCCH reception, or an indication to move to a lower power state. The UE may also determine the second time based on or more of: a next DRX active time, a WUS monitoring occasion of a next DRX cycle, or the first indication.

In another example, the reference signal is an SRS. In this example, to process the reference signal information during the DRX inactive time in accordance with the configuration, the UE is configured to send the SRS to the network entity during the DRX inactive time.

In another example, the reference signal is a CSI-RS. In this example, to process the reference signal information during the DRX inactive time in accordance with the configuration, the UE is configured to receive the CSI-RS from the network entity during the DRX inactive time. Further in this example, the reference signal report is a CSI-RS report. To process the reference signal information, the UE is configured to generate, based on the CSI-RS, the CSI-RS report during the DRX inactive time. The UE may also generate CSI-RS information based on the CSI-RS, where the CSI-RS report includes the CSI-RS information. The UE may also send the CSI-RS report to the second network entity during the DRX inactive time.

In another example, the reference signal report is a CSI-RS report. In this example, to process the reference signal information, the UE is configured to buffer one or more of the CSI-RS or the CSI-RS report during the DRX inactive time, and send the CSI-RS report to the second network entity based on one or more of entering the DRX active time, reaching a specified time, or a request from the second network entity.

In a further example, to process the reference signal information during the DRX inactive time in accordance with the configuration, the UE is configured to process the reference signal information during the DRX inactive time in accordance with the configuration and further based on a quantity of one or more ports on which the reference signal is received or sent.

In another example, to process the reference signal information during the DRX inactive time in accordance with the configuration, the UE is configured to process the reference signal information during the DRX inactive time in accordance with the configuration and further based on a sleep mode of the UE during the DRX inactive time.

The UE may also be configured to process the reference signal information during the DRX inactive time in accordance with the configuration and further based on power information of the UE, reported from time to time or based on request to NW. The power information may include one or more of: a charging rate profile of the UE; a discharging rate profile of the UE, an energy state/level profile of the UE.

In another example, to process the reference signal information during the DRX inactive time in accordance with the configuration, the UE is configured to process the reference signal information during the DRX inactive time in accordance with the configuration and further based on channel information of a channel used by the UE and the network entity to communicate.

The UE may be further configured to receive an indication to skip PDCCH reception during the DRX active time, process the reference signal information during the DRX inactive time in accordance with an extended duration of the DRX inactive time, wherein the extended duration of the DRX inactive time is based on the indication to skip PDCCH reception during the DRX active time.

In another example, the UE may be further configured to start an inactivity timer during the DRX active time, determine a remaining duration of the DRX inactive time based on expiration of the activity timer, and process the reference signal information during the DRX inactive time in accordance with the remaining duration of the DRX inactive time.

FIG. 16 is a flow chart illustrating an exemplary process 1600 for processing reference signals during a DRX inactive time in accordance with some aspects of the present disclosure. As described below, a particular implementation may omit some or all illustrated features, and may not require some illustrated features to implement all embodiments. In some examples, the network entity 1400 illustrated in FIG. 14 may be configured to carry out the process 1600. In some examples, any suitable apparatus or means for carrying out the functions or algorithm described below may carry out the process 1600. The process of FIG. 16 is substantially reciprocal to that of the process described in FIG. 15. The process of FIG. 16 may be performed by a base station or another UE operating as the primary UE in a sidelink communication.

At block 1602, the network entity may be configured to instruct a UE to operate according to a connected DRX mode based on a WUS, wherein the connected DRX mode includes a DRX active time and a DRX inactive time.

At block 1604, the network entity may be configured to receive, from the UE, capability information of the UE to process, during the DRX inactive time, reference signal information, wherein the reference signal information includes one or more of: a reference signal or a reference signal report At block 1606, the network entity may be configured to send, to the UE, a configuration based on the capability information, wherein the configuration specifies how the UE is to process the reference signal information during the DRX inactive time.

The following numbered clauses illustrate one or more aspects of the devices and techniques described in this disclosure.

Aspect 1—A first network entity for wireless communication, the first network entity comprising: a memory; and at least one processor coupled to the memory, wherein the at least one processor is configured to: operate according to a connected discontinuous reception (DRX) mode based on a wakeup signal (WUS), wherein the connected DRX mode includes a DRX active time and a DRX inactive time; send, to a second network entity, capability information of the first network entity to process, during the DRX inactive time, reference signal information, wherein the reference signal information includes one or more of: a reference signal or a reference signal report; receive, from the second network entity, a configuration based on the capability information, wherein the configuration specifies how the first network entity is to process the reference signal information during the DRX inactive time; and process the reference signal information during the DRX inactive time in accordance with the configuration.

Aspect 2—The first network entity of Aspect 1, wherein the capability information of the first network entity to process the reference signal information during the DRX inactive time comprises one or more of: information indicative of a first capability of the first network entity to send a sounding reference signal (SRS) during the DRX inactive time, wherein the SRS is the reference signal, information indicative of a second capability of the first network entity to receive a channel state information reference signal (CSI-RS) during the DRX inactive time, wherein the CSI-RS is the reference signal, information indicative of a third capability of the first network entity to generate a CSI-RS report during the DRX inactive time, wherein the CSI-RS report is the reference signal report, information indicative of a fourth capability of the first network entity to send the CSI-RS report during the DRX inactive time, wherein the CSI-RS report is the reference signal report, information indicative of a firth capability of the first network entity to buffer the CSI-RS during the DRX inactive time and send the CSI-RS report during the DRX active time, wherein the CSI-RS is the reference signal and the CSI-RS report is the reference signal report, information indicative of a sixth capability of the first network entity to buffer CSI-RS samples during the DRX inactive time and send the CSI-RS report at a specified time, wherein the CSI-RS report is the reference signal report, or information indicative of a seventh capability of the first network entity to buffer CSI-RS samples during the DRX inactive time and send the CSI-RS report based on a request from the second network entity, wherein the CSI-RS report is the reference signal report.

Aspect 3—The first network entity of Aspect 2, wherein the capability information of the first network entity to process the reference signal information during the DRX inactive time is based on one or more of: a duration of the DRX inactive time, a time period between the DRX active time and a transmission or a reception of the reference signal, or sleep mode parameters for the first network entity during the DRX inactive time.

Aspect 4—The first network entity of any of Aspects 1-3, wherein, to process the reference signal information during the DRX inactive time in accordance with the configuration, the at least one processor is configured to: process, based on a duration between a first indication of a first time and a second time, the reference signal information during the DRX inactive time in accordance with the configuration.

Aspect 5—The first network entity of Aspect 4, wherein the first indication of the first time is one or more of: an indication to skip physical downlink control channel (PDCCH) reception, or an indication to move to a lower power state.

Aspect 6—The first network entity of Aspect 4, wherein the at least one processor is configured to: determine the second time based on or more of: a next DRX active time, a WUS monitoring occasion of a next DRX cycle, or the first indication.

Aspect 7—The first network entity of any of Aspects 1-6, wherein to send, to the second network entity, the capability information of the first network entity to process, during the DRX inactive time, reference signal information, the at least one processor is configured to: send, to the second network entity, the capability information: during initial access with the second network entity, based on a capability inquiry, in user assistance information in radio resource control (RRC) signaling, or in one or more of layer 1 signaling, layer 2 signaling, or layer 3 signaling.

Aspect 8—The first network entity of any of Aspects 1-7, wherein the reference signal is a sounding reference signal (SRS), and wherein, to process the reference signal information during the DRX inactive time in accordance with the configuration, the at least one processor is configured to: send the SRS to the second network entity during the DRX inactive time.

Aspect 9—The first network entity of any of Aspects 1-7, wherein the reference signal is a channel state information reference signal (CSI-RS), and wherein, to process the reference signal information during the DRX inactive time in accordance with the configuration, the at least one processor is configured to: receive the CSI-RS from the second network entity during the DRX inactive time.

Aspect 10—The first network entity of Aspect 9, wherein the reference signal report is a CSI-RS report, and wherein, to process the reference signal information, the at least one processor is further configured to: generate, based on the CSI-RS, the CSI-RS report during the DRX inactive time.

Aspect 11—The first network entity of Aspect 10, wherein, to generate the CSI-RS report, the at least one processor is configured to generate CSI-RS information based on the CSI-RS, and wherein the CSI-RS report includes the CSI-RS information.

Aspect 12—The first network entity of Aspect 10, wherein, to process the reference signal information, the at least one processor is configured to: send the CSI-RS report to the second network entity during the DRX inactive time.

Aspect 13—The first network entity of Aspect 9, wherein the reference signal report is a CSI-RS report, and wherein, to process the reference signal information, the at least one processor is configured to: buffer one or more of the CSI-RS or the CSI-RS report during the DRX inactive time; and send the CSI-RS report to the second network entity based on one or more of entering the DRX active time, reaching a specified time, or a request from the second network entity.

Aspect 14—The first network entity of any of Aspects 1-13, wherein, to process the reference signal information during the DRX inactive time in accordance with the configuration, the at least one processor is configured to: process, based on a quantity of one or more ports on which the reference signal is received or sent, the reference signal information during the DRX inactive time in accordance with the configuration.

Aspect 15—The first network entity of any of Aspects 1-14, wherein, to process the reference signal information during the DRX inactive time in accordance with the configuration, the at least one processor is configured to: process, based on a sleep mode of the first network entity during the DRX inactive time, the reference signal information during the DRX inactive time in accordance with the configuration.

Aspect 16—The first network entity of any of Aspects 1-15, wherein, to process the reference signal information during the DRX inactive time in accordance with the configuration, the at least one processor is configured to: process, based on power information of the first network entity, the reference signal information during the DRX inactive time in accordance with the configuration, wherein the power information includes one or more of: a charging rate of the first network entity; a charging rate profile of the first network entity; a discharging rate of the first network entity; a discharging rate profile of the first network entity; an energy state of the first network entity; or an energy state profile of the first network entity.

Aspect 17—The first network entity of any of Aspects 1-16, wherein, to process the reference signal information during the DRX inactive time in accordance with the configuration, the at least one processor is configured to: process, based on channel information corresponding to a communication channel between the first network entity and the second network entity, the reference signal information during the DRX inactive time in accordance with the configuration.

Aspect 18—The first network entity of any of Aspects 1-17, wherein the capability information includes information indicative of a capability to process the reference signal information during the DRX inactive time in accordance with a duration of the DRX inactive time in relation to a duration of a sleep mode of the first network entity, and wherein the at least one processor is configured to: receive the configuration based on the information indicative of the capability to process the reference signal information during the DRX inactive time in accordance with the duration of the DRX inactive time in relation to the duration of a sleep mode of the first network entity.

Aspect 19—The first network entity of any of Aspects 1-18, wherein the at least one processor is configured to: receive an indication to skip physical downlink control channel (PDCCH) reception during the DRX active time; and process the reference signal information during the DRX inactive time in accordance with an extended duration of the DRX inactive time, wherein the extended duration of the DRX inactive time is based on the indication to skip PDCCH reception during the DRX active time.

Aspect 20—The first network entity of any of Aspects 1-19, wherein the at least one processor is configured to: start an inactivity timer during the DRX active time; determine a remaining duration of the DRX inactive time based on expiration of the activity timer; and process the reference signal information during the DRX inactive time in accordance with the remaining duration of the DRX inactive time.

Aspect 21—The first network entity of any of Aspects 1-120, wherein the at least one processor is configured to: receive the WUS from the second network entity; and start a duration timer for the DRX active time based on receipt of the WUS.

Aspect 22—A first network entity for wireless communication, the first network entity comprising: a memory; and at least one processor coupled to the memory, wherein the at least one processor is configured to: instruct a second network entity to operate according to a connected discontinuous reception (DRX) mode based on a wakeup signal (WUS), wherein the connected DRX mode includes a DRX active time and a DRX inactive time; receive, from the second network entity, capability information of the second network entity to process, during the DRX inactive time, reference signal information, wherein the reference signal information includes one or more of: a reference signal or a reference signal report; and send, to the second network entity, a configuration based on the capability information, wherein the configuration specifies how the second network entity is to process the reference signal information during the DRX inactive time.

Aspect 23—The first network entity of Aspect 22, wherein the capability information of the second network entity to process the reference signal information during the DRX inactive time comprises one or more of: information indicative of a first capability of the second network entity to send a sounding reference signal (SRS) during the DRX inactive time, wherein the SRS is the reference signal, information indicative of a second capability of the second network entity to receive a channel state information reference signal (CSI-RS) during the DRX inactive time, wherein the CSI-RS is the reference signal, information indicative of a third capability of the second network entity to generate a CSI-RS report during the DRX inactive time, wherein the CSI-RS report is the reference signal report, information indicative of a fourth capability of the second network entity to send the CSI-RS report during the DRX inactive time, wherein the CSI-RS report is the reference signal report, information indicative of a firth capability of the second network entity to buffer the CSI-RS during the DRX inactive time and send the CSI-RS report during the DRX active time, wherein the CSI-RS is the reference signal and the CSI-RS report is the reference signal report, information indicative of a sixth capability of the second network entity to buffer CSI-RS samples during the DRX inactive time and send the CSI-RS report at a specified time, wherein the CSI-RS report is the reference signal report, or information indicative of a seventh capability of the second network entity to buffer CSI-RS samples during the DRX inactive time and send the CSI-RS report based on a request from the first network entity, wherein the CSI-RS report is the reference signal report.

Aspect 24—The first network entity of Aspect 23, wherein the capability information of the second network entity to process the reference signal information during the DRX inactive time is based on one or more of: a duration of the DRX inactive time, a time period between the DRX active time and a transmission or a reception of the reference signal, or sleep mode parameters for the second network entity during the DRX inactive time.

Aspect 25—The first network entity of any of Aspects 22-24, wherein the configuration specifies how the second network entity is to process the reference signal information during the DRX inactive time based on a duration between first indication of a first time and a second time.

Aspect 26—The first network entity of Aspect 25, wherein the first indication of the first time is one or more of: an indication to skip physical downlink control channel (PDCCH) reception, or an indication to move to a lower power state.

Aspect 27—The first network entity of Aspect 25, wherein the second time is based on or more of: a next DRX active time, a WUS monitoring occasion of a next DRX cycle, or the first indication.

Aspect 28—The first network entity of any of Aspects 22-27, wherein to receive, from the second network entity, the capability information of the second network entity to process, during the DRX inactive time, reference signal information, the at least one processor is configured to: receive, from the second network entity, the capability information: during initial access with the second network entity, based on a capability inquiry, in user assistance information in radio resource control (RRC) signaling, or in one or more of layer 1 signaling, layer 2 signaling, or layer 3 signaling.

Aspect 29—The first network entity of any of Aspects 22-28, wherein the reference signal is a sounding reference signal (SRS), and wherein the at least one processor is configured to: receive the SRS from the second network entity during the DRX inactive time.

Aspect 30—The first network entity of any of Aspects 22-28, wherein the reference signal is a channel state information reference signal (CSI-RS), and wherein the at least one processor is configured to: send the CSI-RS to the second network entity during the DRX inactive time.

Aspect 31—The first network entity of any of Aspects 22-28, wherein the reference signal report is a channel state information reference signal (CSI-RS) report, and wherein the at least one processor is configured to: receive the CSI-RS report from the second network entity during the DRX inactive time.

Aspect 32—The first network entity of any of Aspects 22-28, wherein the reference signal report is a channel state information reference signal (CSI-RS) report, and wherein the at least one processor is configured to: send a request to the second network entity to receive the CSI-RS report; and receive the CSI-RS report based on the request.

Aspect 33—The first network entity of any of Aspects 22-32, wherein the configuration specifies how the second network entity is to process the reference signal information during the DRX inactive time based on a quantity of one or more ports on which the reference signal is received or sent by the second network entity.

Aspect 34—The first network entity of any of Aspects 22-33, wherein the configuration specifies how the second network entity is to process the reference signal information during the DRX inactive time based on a sleep mode of the second network entity during the DRX inactive time.

Aspect 35. The first network entity of any of Aspects 22-34, wherein the configuration specifies how the second network entity is to process the reference signal information during the DRX inactive time based on power information of the second network entity, wherein the power information includes one or more of: a charging rate of the second network entity; a charging rate profile of the second network entity; a discharging rate of the second network entity; a discharging rate profile of the second network entity, an energy state of the second network entity, or an energy state profile of the second network entity.

Aspect 36—The first network entity of any of Aspects 22-35, second on channel information of a channel used by the first network entity and the second network entity to communicate.

Aspect 37—The first network entity of any of Aspects 22-36, wherein the capability information includes information indicative of a capability to process the reference signal information during the DRX inactive time in accordance with a duration of the DRX inactive time in relation to a duration of a sleep mode of the second network entity, and wherein the at least one processor is configured to: send the configuration based on the information indicative of the capability to process the reference signal information during the DRX inactive time in accordance with the duration of the DRX inactive time in relation to the duration of a sleep mode of the first network entity.

Aspect 38—The first network entity of any of Aspects 22-37, wherein the at least one processor is configured to: send an indication to skip physical downlink control channel (PDCCH) reception or an indication of end of burst during the DRX active time, wherein the configuration specifies how the second network entity is to process the reference signal information during the DRX inactive time in accordance with an extended duration of the DRX inactive time, wherein the extended duration of the DRX inactive time is based on the indication to skip PDCCH reception or the indication of end of burst during the DRX active time.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A first network entity for wireless communication, the first network entity comprising:
  at least one memory; and
  at least one processor coupled to the at least one memory, wherein the at least one processor is configured to cause the first network entity to:
    operate according to a connected discontinuous reception (DRX) mode based on a wakeup signal (WUS), wherein the connected DRX mode includes a DRX active time and a DRX inactive time;
    send, to a second network entity, capability information of the first network entity to process, during the DRX inactive time, reference signal information, wherein the reference signal information includes one or more of: a reference signal or a reference signal report;
    receive, from the second network entity, a configuration based on the capability information, wherein the configuration specifies how the first network entity is to process the reference signal information during the DRX inactive time; and process the reference signal information during the DRX inactive time in accordance with the configuration.

2. The first network entity of claim 1, wherein the capability information of the first network entity to process the reference signal information during the DRX inactive time comprises one or more of:

information indicative of a first capability of the first network entity to send a sounding reference signal (SRS) during the DRX inactive time, wherein the SRS is the reference signal, information indicative of a second capability of the first network entity to receive a channel state information reference signal (CSI-RS) during the DRX inactive time, wherein the CSI-RS is the reference signal, information indicative of a third capability of the first network entity to generate a CSI-RS report during the DRX inactive time, wherein the CSI-RS report is the reference signal report, information indicative of a fourth capability of the first network entity to send the CSI-RS report during the DRX inactive time, wherein the CSI-RS report is the reference signal report, information indicative of a firth capability of the first network entity to buffer the CSI-RS during the DRX inactive time and send the CSI-RS report during the DRX active time, wherein the CSI-RS is the reference signal and the CSI-RS report is the reference signal report, information indicative of a sixth capability of the first network entity to buffer CSI-RS samples during the DRX inactive time and send the CSI-RS report at a specified time, wherein the CSI-RS report is the reference signal report, or information indicative of a seventh capability of the first network entity to buffer CSI-RS samples during the DRX inactive time and send the CSI-RS report based on a request from the second network entity, wherein the CSI-RS report is the reference signal report.

3. The first network entity of claim 2, wherein the capability information of the first network entity to process the reference signal information during the DRX inactive time is based on one or more of:

a duration of the DRX inactive time, a time period between the DRX active time and a transmission or a reception of the reference signal, or sleep mode parameters for the first network entity during the DRX inactive time.

4. The first network entity of claim 1, wherein, to process the reference signal information during the DRX inactive time in accordance with the configuration, the at least one processor is configured to cause the first network entity to:

process, based on a duration between a first indication of a first time and a second time, the reference signal information during the DRX inactive time in accordance with the configuration.

5. The first network entity of claim 4, wherein the first indication of the first time is one or more of:

an indication to skip physical downlink control channel (PDCCH) reception, or an indication to move to a lower power state.

6. The first network entity of claim 4, wherein the at least one processor is configured to cause the first network entity to:

determine the second time based on or more of:

a next DRX active time, a WUS monitoring occasion of a next DRX cycle, or the first indication.

7. The first network entity of claim 1, wherein to send, to the second network entity, the capability information of the first network entity to process, during the DRX inactive time, reference signal information, the at least one processor is configured to cause the first network entity to:

send, to the second network entity, the capability information:

during initial access with the second network entity, based on a capability inquiry, in user assistance information in radio resource control (RRC) signaling, or in one or more of layer 1 signaling, layer 2 signaling, or layer 3 signaling.

8. The first network entity of claim 1, wherein the reference signal is a sounding reference signal (SRS), and wherein, to process the reference signal information during the DRX inactive time in accordance with the configuration, the at least one processor is configured to cause the first network entity to:

send the SRS to the second network entity during the DRX inactive time.

9. The first network entity of claim 1, wherein the reference signal is a channel state information reference signal (CSI-RS), and wherein, to process the reference signal information during the DRX inactive time in accordance with the configuration, the at least one processor is configured to cause the first network entity to:

receive the CSI-RS from the second network entity during the DRX inactive time.

10. The first network entity of claim 9, wherein the reference signal report is a CSI-RS report, and wherein, to process the reference signal information, the at least one processor is further configured to cause the first network entity to:

generate, based on the CSI-RS, the CSI-RS report during the DRX inactive time.

11. The first network entity of claim 10, wherein, to generate the CSI-RS report, the at least one processor is configured to cause the first network entity to:

generate CSI-RS information based on the CSI-RS, and wherein the CSI-RS report includes the CSI-RS information.

12. The first network entity of claim 10, wherein, to process the reference signal information, the at least one processor is configured to cause the first network entity to:

send the CSI-RS report to the second network entity during the DRX inactive time.

13. The first network entity of claim 9, wherein the reference signal report is a CSI-RS report, and wherein, to process the reference signal information, the at least one processor is configured to cause the first network entity to:

buffer one or more of the CSI-RS or the CSI-RS report during the DRX inactive time; and send the CSI-RS report to the second network entity based on one or more of entering the DRX active time, reaching a specified time, or a request from the second network entity.

14. The first network entity of claim 1, wherein, to process the reference signal information during the DRX inactive time in accordance with the configuration, the at least one processor is configured to cause the first network entity to:

process, based on a quantity of one or more ports on which the reference signal is received or sent, the reference signal information during the DRX inactive time in accordance with the configuration.

15. The first network entity of claim 1, wherein, to process the reference signal information during the DRX inactive time in accordance with the configuration, the at least one processor is configured to cause the first network entity to:

process, based on a sleep mode of the first network entity during the DRX inactive time, the reference signal information during the DRX inactive time in accordance with the configuration.

16. The first network entity of claim 1, wherein, to process the reference signal information during the DRX inactive time in accordance with the configuration, the at least one processor is configured to cause the first network entity to:

process, based on power information of the first network entity, the reference signal information during the DRX inactive time in accordance with the configuration, wherein the power information includes one or more of:

a charging rate of the first network entity;

a charging rate profile of the first network entity;

a discharging rate of the first network entity;

a discharging rate profile of the first network entity;

an energy state of the first network entity; or an energy state profile of the first network entity.

17. The first network entity of claim 1, wherein, to process the reference signal information during the DRX inactive time in accordance with the configuration, the at least one processor is configured to cause the first network entity to:

process, based on channel information corresponding to a communication channel between the first network entity and the second network entity, the reference signal information during the DRX inactive time in accordance with the configuration.

18. The first network entity of claim 1, wherein the capability information includes information indicative of a capability to process the reference signal information during the DRX inactive time in accordance with a duration of the DRX inactive time in relation to a duration of a sleep mode of the first network entity, and wherein the at least one processor is configured to cause the first network entity to:

receive the configuration based on the information indicative of the capability to process the reference signal information during the DRX inactive time in accordance with the duration of the DRX inactive time in relation to the duration of a sleep mode of the first network entity.

19. The first network entity of claim 1, wherein the at least one processor is configured to cause the first network entity to:

receive an indication to skip physical downlink control channel (PDCCH) reception during the DRX active time; and process the reference signal information during the DRX inactive time in accordance with an extended duration of the DRX inactive time, wherein the extended duration of the DRX inactive time is based on the indication to skip PDCCH reception during the DRX active time.

20. The first network entity of claim 1, wherein the at least one processor is configured to cause the first network entity to:

start an inactivity timer during the DRX active time;

determine a remaining duration of the DRX inactive time based on expiration of the inactivity timer; and process the reference signal information during the DRX inactive time in accordance with the remaining duration of the DRX inactive time.

21. The first network entity of claim 1, wherein the at least one processor is configured to cause the first network entity to:

receive the WUS from the second network entity; and start a duration timer for the DRX active time based on receipt of the WUS.

22. A first network entity for wireless communication, the first network entity comprising:

at least one memory; and at least one processor coupled to the at least one memory, wherein the at least one processor is configured to cause the first network entity to:

instruct a second network entity to operate according to a connected discontinuous reception (DRX) mode based on a wakeup signal (WUS), wherein the connected DRX mode includes a DRX active time and a DRX inactive time;

receive, from the second network entity, capability information of the second network entity to process, during the DRX inactive time, reference signal information, wherein the reference signal information includes one or more of: a reference signal or a reference signal report; and send, to the second network entity, a configuration based on the capability information, wherein the configuration specifies how the second network entity is to process the reference signal information during the DRX inactive time.

23. The first network entity of claim 22, wherein the capability information of the second network entity to process the reference signal information during the DRX inactive time comprises one or more of:

information indicative of a first capability of the second network entity to send a sounding reference signal (SRS) during the DRX inactive time, wherein the SRS is the reference signal, information indicative of a second capability of the second network entity to receive a channel state information reference signal (CSI-RS) during the DRX inactive time, wherein the CSI-RS is the reference signal, information indicative of a third capability of the second network entity to generate a CSI-RS report during the DRX inactive time, wherein the CSI-RS report is the reference signal report, information indicative of a fourth capability of the second network entity to send the CSI-RS report during the DRX inactive time, wherein the CSI-RS report is the reference signal report, information indicative of a firth capability of the second network entity to buffer the CSI-RS during the DRX inactive time and send the CSI-RS report during the DRX active time, wherein the CSI-RS is the reference signal and the CSI-RS report is the reference signal report, information indicative of a sixth capability of the second network entity to buffer CSI-RS samples during the DRX inactive time and send the CSI-RS report at a specified time, wherein the CSI-RS report is the reference signal report, or information indicative of a seventh capability of the second network entity to buffer CSI-RS samples during the DRX inactive time and send the CSI-RS report based on a request from the first network entity, wherein the CSI-RS report is the reference signal report.

24. The first network entity of claim 23, wherein the capability information of the second network entity to process the reference signal information during the DRX inactive time is based on one or more of:

a duration of the DRX inactive time, a time period between the DRX active time and a transmission or a reception of the reference signal, or sleep mode parameters for the second network entity during the DRX inactive time.

25. The first network entity of claim 22, wherein the configuration specifies how the second network entity is to process the reference signal information during the DRX inactive time based on a duration between first indication of a first time and a second time.

26. The first network entity of claim 25, wherein the first indication of the first time is one or more of:

an indication to skip physical downlink control channel (PDCCH) reception, or an indication to move to a lower power state.

27. The first network entity of claim 25, wherein the second time is based on or more of:

a next DRX active time, a WUS monitoring occasion of a next DRX cycle, or the first indication.

28. The first network entity of claim 22, wherein to receive, from the second network entity, the capability information of the second network entity to process, during the DRX inactive time, reference signal information, the at least one processor is configured to cause the first network entity to:

receive, from the second network entity, the capability information:

during initial access with the second network entity, based on a capability inquiry, in user assistance information in radio resource control (RRC) signaling, or in one or more of layer 1 signaling, layer 2 signaling, or layer 3 signaling.

29. The first network entity of claim 22, wherein the reference signal is a sounding reference signal (SRS), and wherein the at least one processor is configured to cause the first network entity to:

receive the SRS from the second network entity during the DRX inactive time.

30. The first network entity of claim 22, wherein the reference signal is a channel state information reference signal (CSI-RS), and wherein the at least one processor is configured to cause the first network entity to:

send the CSI-RS to the second network entity during the DRX inactive time.

31. The first network entity of claim 22, wherein the reference signal report is a channel state information reference signal (CSI-RS) report, and wherein the at least one processor is configured to cause the first network entity to:

receive the CSI-RS report from the second network entity during the DRX inactive time.

32. The first network entity of claim 22, wherein the reference signal report is a channel state information reference signal (CSI-RS) report, and wherein the at least one processor is configured to cause the first network entity to:

send a request to the second network entity to receive the CSI-RS report; and receive the CSI-RS report based on the request.

33. The first network entity of claim 22, wherein the configuration specifies how the second network entity is to process the reference signal information during the DRX inactive time based on a quantity of one or more ports on which the reference signal is received or sent by the second network entity.

34. The first network entity of claim 22, wherein the configuration specifies how the second network entity is to process the reference signal information during the DRX inactive time based on a sleep mode of the second network entity during the DRX inactive time.

35. The first network entity of claim 22, wherein the configuration specifies how the second network entity is to process the reference signal information during the DRX inactive time based on power information of the second network entity, wherein the power information includes one or more of:

a charging rate of the second network entity;

a charging rate profile of the second network entity;

a discharging rate of the second network entity;

a discharging rate profile of the second network entity, an energy state of the second network entity, or an energy state profile of the second network entity.

36. The first network entity of claim 22, wherein the at least one processor is further configured to cause the first network entity to:

send channel information of a channel used by the first network entity and the second network entity to communicate.

37. The first network entity of claim 22, wherein the capability information includes information indicative of a capability to process the reference signal information during the DRX inactive time in accordance with a duration of the DRX inactive time in relation to a duration of a sleep mode of the second network entity, and wherein the at least one processor is configured to cause the first network entity to:

send the configuration based on the information indicative of the capability to process the reference signal information during the DRX inactive time in accordance with the duration of the DRX inactive time in relation to the duration of a sleep mode of the first network entity.

38. The first network entity of claim 22, wherein the at least one processor is configured to cause the first network entity to:

send, during the DRX active time, an indication to skip physical downlink control channel (PDCCH) reception or an indication of end of burst, wherein the configuration specifies how the second network entity is to process the reference signal information during the DRX inactive time in accordance with an extended duration of the DRX inactive time, wherein the extended duration of the DRX inactive time is based on the indication to skip PDCCH reception or the indication of end of burst during the DRX active time.

* * * * *